United States Patent
Lynggaard et al.

(10) Patent No.: US 6,966,495 B2
(45) Date of Patent: Nov. 22, 2005

(54) DEVICES METHOD AND COMPUTER PROGRAM FOR POSITION DETERMINATION

(75) Inventors: Stefan Lynggaard, Lund (SE); Mats Petter Pettersson, Lund (SE)

(73) Assignee: Anoto AB, Lund (SE)

( * ) Notice: Subject to any disclaimer, the term of this patent is extended or adjusted under 35 U.S.C. 154(b) by 174 days.

(21) Appl. No.: 10/179,966

(22) Filed: Jun. 26, 2002

(65) Prior Publication Data

US 2003/0029919 A1 Feb. 13, 2003

Related U.S. Application Data

(60) Provisional application No. 60/302,359, filed on Jul. 3, 2001.

(30) Foreign Application Priority Data

Jun. 26, 2001 (SE) .............................. 0102253

(51) Int. Cl.⁷ ................................................ G06K 7/10
(52) U.S. Cl. ........................... 235/472.01; 235/472.02; 235/472.03; 235/487; 235/494
(58) Field of Search ....................... 235/472.01, 472.02, 235/472.08, 487, 494

(56) References Cited

U.S. PATENT DOCUMENTS

| | | | |
|---|---|---|---|
| 4,856,077 A | * | 8/1989 | Rothfjell ..................... 382/123 |
| 5,051,736 A | * | 9/1991 | Bennett et al. ............. 345/180 |
| 5,221,833 A | * | 6/1993 | Hecht ......................... 235/494 |
| 5,245,165 A | | 9/1993 | Zhang |
| 5,449,895 A | * | 9/1995 | Hecht et al. ................ 235/494 |
| 5,661,506 A | * | 8/1997 | Lazzouni et al. ........... 345/179 |
| 5,852,434 A | | 12/1998 | Sekendur |
| 6,330,976 B1 | * | 12/2001 | Dymetman et al. ......... 235/487 |
| 6,432,518 B1 | * | 8/2002 | Torii et al. ............... 428/195.1 |
| 6,732,927 B2 | * | 5/2004 | Olsson et al. ............... 235/454 |

FOREIGN PATENT DOCUMENTS

| | | |
|---|---|---|
| SE | 0102254-0 | 12/2002 |
| SE | 0103589-8 | 4/2003 |
| SE | 0104088-0 | 6/2003 |
| WO | 00/25293 A1 | 5/2000 |
| WO | 00/73983 A1 | 12/2000 |
| WO | 01/16691 A1 | 3/2001 |
| WO | 01/26032 A1 | 4/2001 |
| WO | 01/26033 A1 | 4/2001 |
| WO | 01/26034 A1 | 4/2001 |
| WO | 01/30589 A1 | 5/2001 |
| WO | 01/61636 A2 | 8/2001 |
| WO | 01/75783 A1 | 10/2001 |

* cited by examiner

Primary Examiner—Michael G. Lee
Assistant Examiner—Kimberly D. Nguyen
(74) Attorney, Agent, or Firm—Birch, Stewart, Kolasch & Birch, LLP

(57) ABSTRACT

A device, a method and a computer program for position determination are provided. The device comprises a processing means for determining a position on a surface on the basis of an image of a position-coding pattern on the surface. The processing means is arranged to decide whether it is possible to determine an acceptable posi- tion on the surface on the basis of the position-coding pattern in the image. In addition, the processing means is arranged to cause the first writing means to write on the surface depending upon the result of said decision.

42 Claims, 15 Drawing Sheets

| Element value | $P_2$ | Bit comb. |
|---|---|---|
| "0" | 0,26 | 0,1 |
| "1" | 0,45 | 0,0 |
| "2" | 0,57 | 1,0 |
| "3" | 0,19 | 1,1 |
33
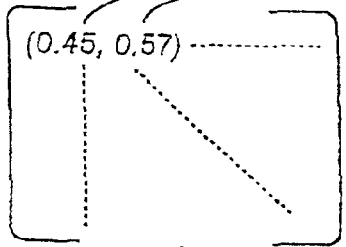
33'
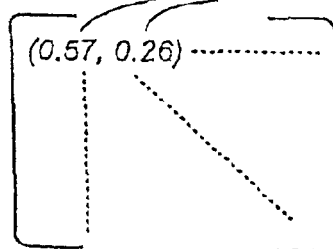
33"
max(0.26, 0.45) = 0.45
max(0.57, 0.19) = 0.57
max(0.45, 0.57) = 0.57
max(0.26, 0.19) = 0.26
(0.45, 0.57)
(0.57, 0.26)
*Fig. 12a*
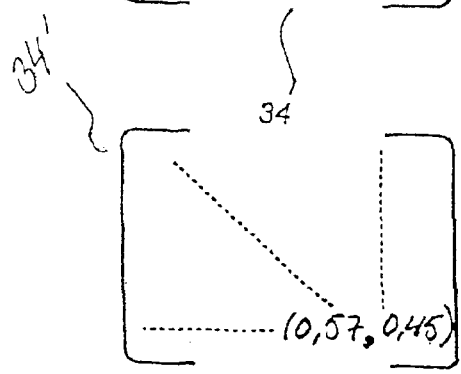
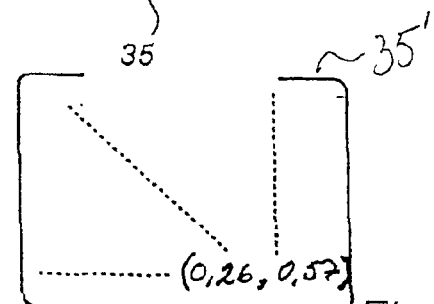
34'  34   35   35'
(0,57, 0,45)
(0,26, 0,57)
*Fig. 12b*
*Fig. 12c*

$[0000001001111010.....]$ $$46 \sim \begin{bmatrix} (0.45, 0.27) & (0.31, 0.41) & (0.73, 0.09) \\ (0.36, 0.14) & (0.73, 0.09) & (0.16, 0.47) \\ (0.72, 0.09) & (0.55, 0.12) & (0.12, 0.55) \end{bmatrix}$$

$$47 \sim \begin{bmatrix} (0.45, 0.15) & (0.15, 0.41) & (0.11, 0.73) \\ (0.36, 0.36) & (0.73, 0.11) & (0.47, 0.24) \\ (0.12, 0.72) & (0.55, 0.22) & (0.22, 0.55) \end{bmatrix}$$

$$48 \sim \begin{bmatrix} (0.55, 0.12) & (0.12, 0.55) & (0.09, 0.72) \\ (0.47, 0.16) & (0.09, 0.73) & (0.14, 0.36) \\ (0.09, 0.73) & (0.41, 0.31) & (0.27, 0.45) \end{bmatrix}$$

$$49 \sim \begin{bmatrix} (0.55, 0.22) & (0.22, 0.55) & (0.72, 0.12) \\ (0.24, 0.47) & (0.11, 0.73) & (0.36, 0.36) \\ (0.73, 0.11) & (0.41, 0.15) & (0.15, 0.45) \end{bmatrix}$$

DEVICES METHOD AND COMPUTER PROGRAM FOR POSITION DETERMINATION

This application claims the benefit of provisional application 60/302,359 filed Jul. 3, 2001.

1. Field of the Invention

The present invention relates to a device for posi- tion determination, comprising a processing means tor determining a position on a surface, on the basis of an image of a position-coding pattern on the surface. The invention also relates to a method and a computer program for position determination.

2. Background Art

It is often useful to have pen and paper handy in order to note down things that it is important to remember. There are, however, a number of alternatives to pen and paper for the storage of information, such as com- puters. The advantage of using computers is that the information can be stored digitally and forwarded imme- diately to other electronic units. The disadvantages are that computers are quite expensive and unwieldy, and that a user must have technical know-how in order to be able to work with them. Pen and paper, on the other hand, can be used by anyone, at any time and irrespective of loca- tion, as they are easily portable.

A communication method that is a combination of the above two storage alternatives is known from WO 01/16691, which is herewith incorporated by reference. The WO publication describes a system for electronic recording and processing of information. The system consists of a base that is provided with a position code for coding positions on the base and a device for recording the information that is written on the base by detecting the position code. The position code is recorded continually while the information is being written down by hand. The sequence of positions that is recorded defines the movement of the device across the base. The information is recorded at the same time as it is written down and it can be stored in the device or transmitted to an external unit such as a computer or a mobile telephone.

WO 00/25293 describes a device and a method for determining the movement of a pen point. The movement of the pen is determined by comparison of images of the base that are recorded in succession. According to one aspect, the movement of the pen is determined by absolute positioning. Alternatively, different areas are provided with different patterns. When the pen is positioned in one of the areas, it can identify the type of area by analyzing the pattern in the area. The resulting analysis can, for example, be used to determine whether or not the pen is to write on the base.

WO 01/30589 describes an electronic pen with a controllable writing means. When a user writes and draws on a surface, the appearance of the writing can be changed, as the pen has functions that, for example, make it possible to produce different colors and types of line. The pen can record images comprising coded data in order to change the properties of the writing and in order to determine its position. It sometimes occurs that a device of the above type does not succeed in recording a position on the base. This means that a part of the information that a user writes down is not recorded either. The user will not be able to be certain that the information that is stored in the device or transmitted to an external unit is com- plete. If information is missing, a supplementary record- ing must be carried out at a later time, an operation that can be very time-consuming.

SUMMARY OF THE INVENTION

An object of the present invention is to remedy the above-mentioned problems of prior-art technique completely or partially.

This object is achieved according to the invention by means of a device, a method and a computer program, which have the features stated in the independent claims. Preferred embodiments are defined in the dependent claims.

According to a first aspect of the present invention, this relates to a device for position determination. The device comprises a processing means for determining a position on a surface on the basis of an image of a position-coding pattern on the surface. The processing means is arranged to decide whether it is possible to determine an acceptable position on the surface on the basis of the position-coding pattern in the image. In addition, the processing means is arranged to cause a first writing means to write on the surface depending upon the result of said decision. Using a device according to the invention, information that is written on the surface using the first writing means can be recorded electronically. The information corresponds to a sequence of acceptable positions that describe the path of the first writing means across the surface.

By causing the first writing means to write on the surface depending upon said decision, a user can know whether an acceptable position can be determined or not. If the writing means writes at a point on the surface, this is an indication that an acceptable position corresponding to the point can/ cannot be determined. In a corresponding way, a line on the surface means that acceptable positions corresponding to a coherent sequence of points can/cannot be determined. The user is thus made fully aware of which information has been recorded by the device, as the recorded information is precisely what was written/not written on the surface.

The position-coding pattern can contain elements that each have at least two possible decoding values. The processing means can be arranged to identify a plurality of the elements in the image, and to calculate for each identified element an associated value probability for each possible decoding value that the element has this decoding value. Each element can consist of at least one mark.

As a rule, one decoding value for an element cannot be determined with complete certainty, as there is a possibility that the element has another of the possible decoding values. The reason for this can be that the position-coding pattern on a surface is not completely perfect. When the position-coding pattern is printed out on a surface, the limited resolution of the printer can mean that the marks are not printed out with absolute precision. The marks can, for example, be printed out slightly deformed or displaced from their "nominal" location. Another reason can be that the recording of images of the position-coding pattern can be carried out in different positions in relation to the surface, that is from varying perspectives. The resultant image distortion can lead to difficulties in determining the decoding values of the elements unambiguously. There can also be a danger that the recording of an image is carried out at such an oblique angle that the elements cannot be identified in the image at all. Other factors that can interfere with the identification of elements on the surface are uneven illumination of the surface, or lack of sharpness that is introduced when recording the image of the position-coding pattern at different distances from the surface. Naturally occurring structures in the surface, and noise originating from impurities on the surface or faults in some component in the device, can also have an adverse effect on the identification of elements. If an element is determined unambiguously, then the value probability that corresponds to the element's unambiguously determined decoding value will be maximal, while the other value probabilities for the element are zero. The more uncertain the decoding value for an element, the less its value probabilities differ from each other. If an element is missing at a location in the position-coding pattern, then the value probabilities for the element will therefore be equally large.

The processing means can be arranged to cause the first writing means to write on the surface only it the processing means decides that an acceptable position on the surface can be determined. This means that the points on the surface at which there is writing correspond to acceptable positions that can be determined by the device. In other words, the information that is written on the surface is what can be recorded by the device. If the writing means stops writing at a point on the surface, this is an indication that an acceptable position on the surface corresponding to this point cannot be determined, and consequently that not all the information can be recorded. If this is caused by unfavorable circumstances during the recording, such as the recording having been carried out at too oblique an angle, there is then an opportunity to carry out a supplementary recording. The advantage of this alternative is that the use of the device is made easier it the user can see what he or she is writing or drawing on the surface. Of course, it is possible to have the alternative when the device works in the opposite way. The processing means is then arranged to cause the first writing means to write on the surface only if the processing means decides that an acceptable position on the surface cannot be determined.

When an image of the position-coding pattern has been recorded, the device can determine an acceptable position on the surface if the image contains sufficient information. The processing means can be arranged to determine a measure of the amount of information that the image contains concerning a position on the surface. A small measure indicates that the image contains little information, which can mean that a position on the surface cannot be determined at all. With a larger measure, the chance increases that a position, and hence an acceptable position, can be determined on the surface.

The processing means can be arranged to compare the measure discussed above with a predetermined limit measure. If the measure exceeds the limit measure, it. is possible to determine a position on the surface on the basis of the image. This position is, however, not necessarily acceptable. If, on the other hand, the measure does not exceed the limit measure, the image cannot be used to determine a position on the surface.

In the case when it is possible to determine a position on the basis of the position-coding pattern in the image, the processing means can be arranged to determine a position probability corresponding to the level of certainty with which the position can be determined. This position probability can then be used to decide whether or not it is possible to determine an acceptable position on the surface.

The position probability corresponding to an image can be determined on the basis of the value probabilities for a predetermined number of selected elements out of all the identified elements. These selected elements can be those that have a dominating value probability for one of the decoding values, that is those that can contribute the most information concerning the position on the surface. The position probability can, for example, be determined by a multiplication of the dominating value probabilities for the selected elements, but it can, of course, also be determined in other ways.

The processing means can be arranged to compare the position probability with a predetermined limit value and to decide that it is possible to determine an acceptable position on the surface on the basis of the image if the position probability exceeds the limit value. If, on the other hand, the position probability does not exceed the limit value, the position that it is possible to determine on the basis of the position-coding pattern in the image is not considered to be acceptable, as it has not been determined with sufficient certainty. The processing means thus decides that it is not possible to determine an acceptable position on the surface.

The above means that if the selected elements are well-defined, that is if each of them has one value probability that is much larger than the others, the chance increases that the position probability will exceed the limit value, and consequently the chance that an acceptable position can be determined on the basis of the recorded image.

The processing means can be arranged to decide that it is possible to determine an acceptable position on the basis of a recorded image if a position can be determined on the basis of the image and this position lies within a predetermined distance from a previously determined acceptable position. This step can, of course, be combined with the above steps in various ways. The processing means can here, for example, be arranged to determine first said measure of how much information the image contains. This measure then indicates whether the position can be determined on the basis of the image. In addition, the processing means can be arranged to decide that it is possible to determine an acceptable position if the position probability for the position that can be determined on the basis of the recorded image exceeds said limit value, and the position lies within said predetermined distance.

The same combination of the above steps does not need to be used throughout during one and the same position-determination session with the device. For example, the session can initially comprise determination of position probabilities1 if possible, for each recorded image. This could involve position determination with probability calculations for the first positions in a sequence that corresponds to one stroke with the first writing means across the surface. For other positions, probability calculations should not need to be used in order to determine whether the writing means is to be activated. On the other hand, the distance from each of the other positions to a previously determined acceptable position could be checked. This last example thus makes possible a more rapid control of the writing on the surface as time is saved in that probability calculations are not made throughout.

A device according to the above can consist of an application-specific integrated circuit (ASIC) . It can, however, also consist of any other circuit that also contains discrete components.

A device according to the above can also be hand-held and can be a shape that makes it easy to handle. In the case where the device is hand-held, it can also comprise the first writing means. The device can then be the shape of a pen, for maximum comfort for the user.

A hand-held device according to the invention can be provided with a transceiver for wireless transmission of data from the device to an external unit. The information that has been recorded using the device can thereby be sent, for example, to an adjacent computer or via a mobile telephone to another computer or mobile telephone. The transmission can be carried out by short-range radio link or using infrared light. Alternatively, the information is transmitted using cables. According to an additional alternative, the hand-held device has a built-in modem for communication with a computer network or telephone network.

A hand-held device according to the invention can also comprise a second writing means for writing on the surface.

The second writing means can be arranged to write on the surface irrespective of whether it is possible to determine an acceptable position on the surface. This embodiment makes it possible for a user to follow all the movements of the device on the surface as the device now functions as a conventional pen. Precisely as in the preceding embodiments, a user is, however, made aware that an acceptable position on the surface cannot be determined by the first writing means stopping/starting writing on the surface.

According to another embodiment, the second writing means can be arranged to write on the surface when the first writing means is not writing on the surface. This embodiment also makes it possible for a user to follow all the movements of the device on the surface.

The first writing means can, for example, write with red ink, while the second writing means can write with black ink, which means that the color of the writing on the surface indicates whether it is possible to determine an acceptable position on the surface.

There are many different techniques with which the writing means described above can write on a surface. For example, they can be nozzles that are arranged to dispense ink onto the surface at certain points. This embodiment makes possible rapid control of the supply of ink to the surface, that is the supply can easily be cut off and opened up.

By dispensing is meant in this connection that ink is ejected from the nozzle.

According to a second aspect, the invention relates to a method for position determination, comprising processing an image of a position-coding pattern on a surface. The processing comprises deciding whether it is possible to determine an acceptable position on the surface on the basis of the position-coding pattern in the image, and causing a first writing means to write on the surface depending upon the result of said decision.

According to a third aspect, the invention relates to a computer program with instructions for position determination on the basis of an image.

The features that were discussed in connection with the device above are, of course, applicable to the method or the computer program according to the invention.

The above features can, of course, be combined in the same embodiment.

BRIEF DESCRIPTION OF DRAWINGS

The present invention will now be described in more detail by means of embodiments and with reference to the accompanying drawings, in which FIG. 12 illustrates the creation of a first and a second matrix.

DETAILED DESCRIPTION OF THE INVENTION

Figure 1:
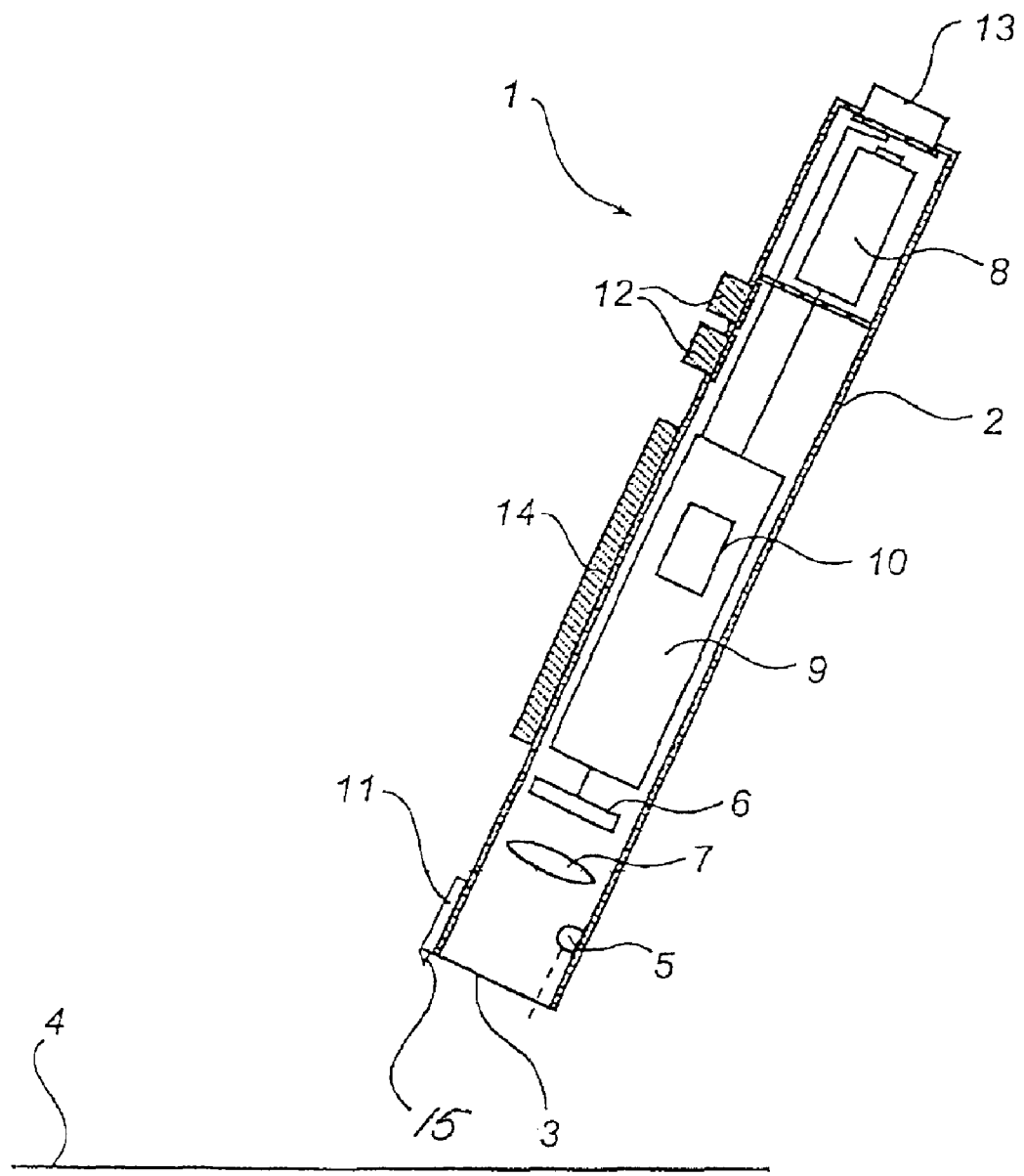
FIG. 1 shows a device for position determination.

FIG. 1 shows a device 1, in the form of a reading pen, for position determination. It comprises a casing 2, which is approximately the same shape as a pen. In the short side of the casing there is an opening 3. The short side is intended to abut against or to be held a short distance from a surface 4 on which the position determination is to be carried out. The device 1 comprises at least one light-emitting diode 5 for illuminating the surface 4, and a light-sensitive area sensor 6, for example a CCD or CMOS image sensor, for recording a two-dimensional digital image of the surface. If reguired, the device 1 can also contain a lens system 7.

The power supply for the device 1 is obtained from a battery 8, which is mounted in a separate compartment in the casing 2.

The device 1 comprises, in addition, an image-processing means 9 for determining a position on the basis of the image recorded by the sensor 6, and in particular a processor unit 10 which is programmed to read images from the sensor 6 and to carry out position determination on the basis of these images.

In this example, the device 1 also comprises a writing means in the form of a nozzle 11 which dispenses ink, and using which it is possible to write or draw on the surface 4. The nozzle 11 can be an ordinary ink-jet nozzle. When the dispensing of ink is stopped with such a nozzle, the supply of ink to the nozzle is guite simply cut off.

The device 1 can also comprise buttons 12, by means of which the device can be activated and controlled. It can also comprise a transceiver 13 for wireless transmission, for example using infrared light or radio waves, of information to and from the device. The device 1 can also comprise a display 14 for displaying information based on the position determination.

A pressure sensor 15 is arranged to indicate when the device 1 is in contact with the surface 4. The light-emitting diode 5 and the area sensor 6 are activated when the pressure sensor is in contact with the surface. Thus the area sensor cannot record images unless the pressure sensor indicates that the device is in contact with the surface.

Figure 2:
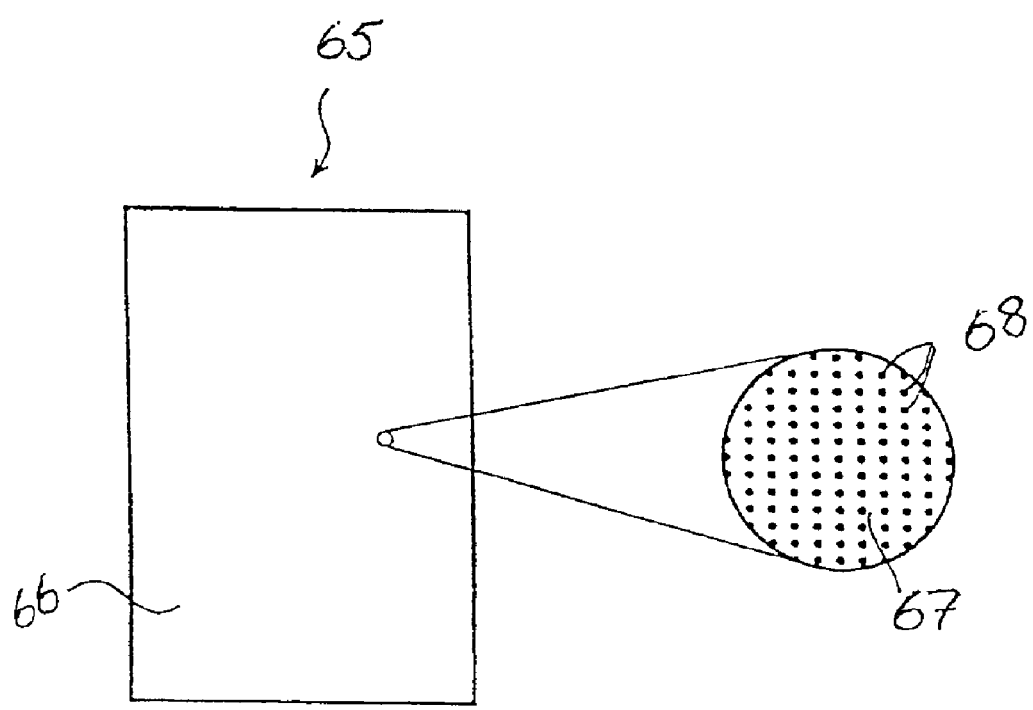
FIG. 2 shows a sheet of paper that is provided with a position-coding pattern.

FIG. 2 shows a sheet of paper 65 that has a surface 66 that is provided with an optically-readable position-coding pattern 67. The position-coding pattern stores positions that can be determined using the device. The pattern consists of marks 68, and is shown greatly enlarged for the sake of clarity.

In this example, the device illuminates the marks 68 with infrared light so that they become visible to the area sensor 6. The ink that is dispensed from the nozzle 11 is of such a kind that it is not visible to the area sensor 6 when it is illuminated with infrared light. This means that the functioning of the device is not affected by the marks being overwritten with the ink. This can be achieved, for example, by the ink not containing any carbon.

The function of the device and the method according to the invention will now be described with reference to the flow chart in FIG. 3.

The reading pen in FIG. 1 is used to record hand-written text at the same time as this is being written on a surface. For this purpose, the area sensor 6 is arranged to record an image of the surface, as mentioned above. In order for position determination to be possible on the basis of the recorded image, the image must contain a coding pattern. In an image of a surface with a coding pattern, which for example consists of dark marks on a lighter background such as the one in FIG. 2, there are clear contrasts between dark areas (marks) and light areas (background). In an image of a surface of an ordinary clean single-colored sheet of paper there are, however, no clear contrasts. The image-processing means is therefore arranged initially to calculate a first information measure (step $\alpha$) that expresses how much information the image contains concerning a position on the surface. The first information measure is calculated on the basis of contrast distributions between light and dark areas in the image. The first information measure can be calculated on the basis of some statistical measure of the luminance distribution in the image, such as standard deviation or the like. Alternatively, the information measure can be calculated on the basis of the technique that is described in Applicant's Swedish Patent Application No. 0102254-0, which is herewith incorporated by reference. More specifically, a background luminance value and an object luminance value can be estimated for a number of partial areas distributed over the image. The difference between the background and object luminance values provides a measure of the contrast in the respec- tive partial areas. The first information measure can then be set to correspond to the number of partial areas with a contrast in excess of a contrast limit value.

The image-processing means is then arranged to compare the first information measure with a first limit measure (step $\alpha'$). If the first information measure exceeds the first limit measure, the image is considered to contain a coding pattern, and the image processing continues. If, on the other hand, the first information measure does not exceed the first limit measure, the image is considered not to contain any coding pattern, and the image processing is terminated.

In order for position determination to be possible on the basis of the recorded image, the image must contain a position-coding pattern, such as the position-coding pattern 67 on the surface 66 in FIG. 2. For this reason, the image-processing means is also arranged to calculate a second information measure (step $\beta$). The second information measure also expresses how much information the image contains concerning a position on the surface. The second information measure can be determined by investigating in the image a feature that is characteristic of a position-coding pattern. For example, the position-coding pattern in FIG. 2 has the characteristic feature that it nominally contains a given number of marks per unit of surface. Therefore the image-processing means 9 is arranged to determine the number of separate objects are identifiable in the image for one of the above-mentioned partial areas. In this example, these objects are the continuous dark areas (possible marks) in the image. The second information measure can be calculated as a function of the difference between the identified number of objects per unit of surface and the given number of marks per unit of surface, with the second information measure decreasing as the difference increases. Alternatively, the second information measure can be set as the number of identified objects per unit of surface. The image-processing means is thereafter arranged to compare the second information measure with a second limit measure (step $\beta'$). If the second information measure exceeds the second limit measure, the image is considered to contain a position-coding pattern, and the image processing continues. If, on the other hand, the second information measure does not exceed the second limit measure, the image is considered not to contain any position-coding pattern, and the image processing is terminated.

A position-coding p4ttern usually contains elements, each of which has at least two possible decoding values. Each element contains at least one mark. The position-coding pattern 67 in FIG. 2 is an example of such a position-coding pattern, using which the reading pen 1 can determine a position. The image-processing means 9 is arranged to identify a plurality of elements in the image. For each identified element, the processing means is thereafter arranged to calculate an associated value probability for each possible decoding value that the element has this decoding value. If an element is determined unambiguously, the value probability that corresponds to the element's unambiguously determined decoding value will be maximal, while the other value probabilities for the element are zero. The more uncertain the decoding value for an element, the less its value probabilities differ from each other. For the purpose of deciding whether a position on the surface can be determined using the position-coding pattern in the image, the image-processing means is, in addition, arranged to calculate a third information measure (step $\gamma$). The third information measure also expresses how much information the image contains concerning a position on the surface. The third information measure can be determined on the basis of the value probabilities for the identified elements. In this example, it is determined by a multiplication of the largest value probabilities for each of the identified elements. If the identified elements are determined unambiguously, the third information measure will be large. Correspondingly, the third information measure will be smaller, the more uncertain the decoding values of the identified elements are. The image-processing means is thereafter arranged to compare the third information measure with a third limit measure (step $\gamma'$) If the third information measure exceeds the third limit measure, the image is considered to contain a position-coding pattern, using which the reading pen 1 can determine a position on the surface, and the image processing continues. If, on the other hand, the third information measure does not exceed the third limit measure, the image is considered not to contain a position-coding pattern, using which the reading pen 1 can determine a position, and the image processing is terminated.

Even if a position can be determined on the basis of an image, it is still not certain that this is an acceptable position on the surface. The image-processing means 9 is therefore arranged to decide whether the position that can be determined on the basis of the image is acceptable.

In this example, said decision is based partly on probability calculations, and partly on comparisons with previously determined acceptable positions on the surface. The image-processing means 9 first determines a position probability (step ϕ) corresponding to the level of certainty with which said position can be determined. The position probability corresponding to said position can be calculated on the basis of the value probabilities for a predetermined number of selected elements out of all the identified elements. In this example, these selected elements are those that have a dominating value probability for one of the decoding values. The position probability can, for example, be determined by a multiplication of the dominating value probabilities for the selected elements. Alternatively, the position probability can consist of, or be calculated from, some probability value that is obtained on the basis of the value probabilities during the calculation of a position. The image-processing means is thereafter arranged to compare the position probability with a limit value (step ϕ'). If the position probability does not exceed the limit value, the image processing is terminated. If, on the other hand, the position probability exceeds the limit value, the image-processing means 9 is arranged to compare the location of the position that can be determined on the basis of the image with the location of a previously determined acceptable position (step Φ). The processing means is thereafter arranged to decide whether the position that can be determined is acceptable (step Φ'). If the position that can be determined on the basis of the image lies within a predetermined distance from said previously determined acceptable position, the position that can be determined is considered to be an acceptable position on the surface. Thus, the image-processing means 9 then decides that it is possible to determine an acceptable position on the surface on the basis of the position-coding pattern in the recorded image. In this example, the image-processing means 9 is, in addition, arranged to cause the writing means to write on the surface if it is decided that an acceptable position on the surface can be determined (step λ). Writing is carried out at the point on the surface that corresponds to the acceptable position. If, on the other hand, the distance between the position that can be determined on the basis of the image and said previously determined acceptable position is greater than the predetermined distance, the device is arranged to cause the writing means not to write on the surface.

Figure 3:
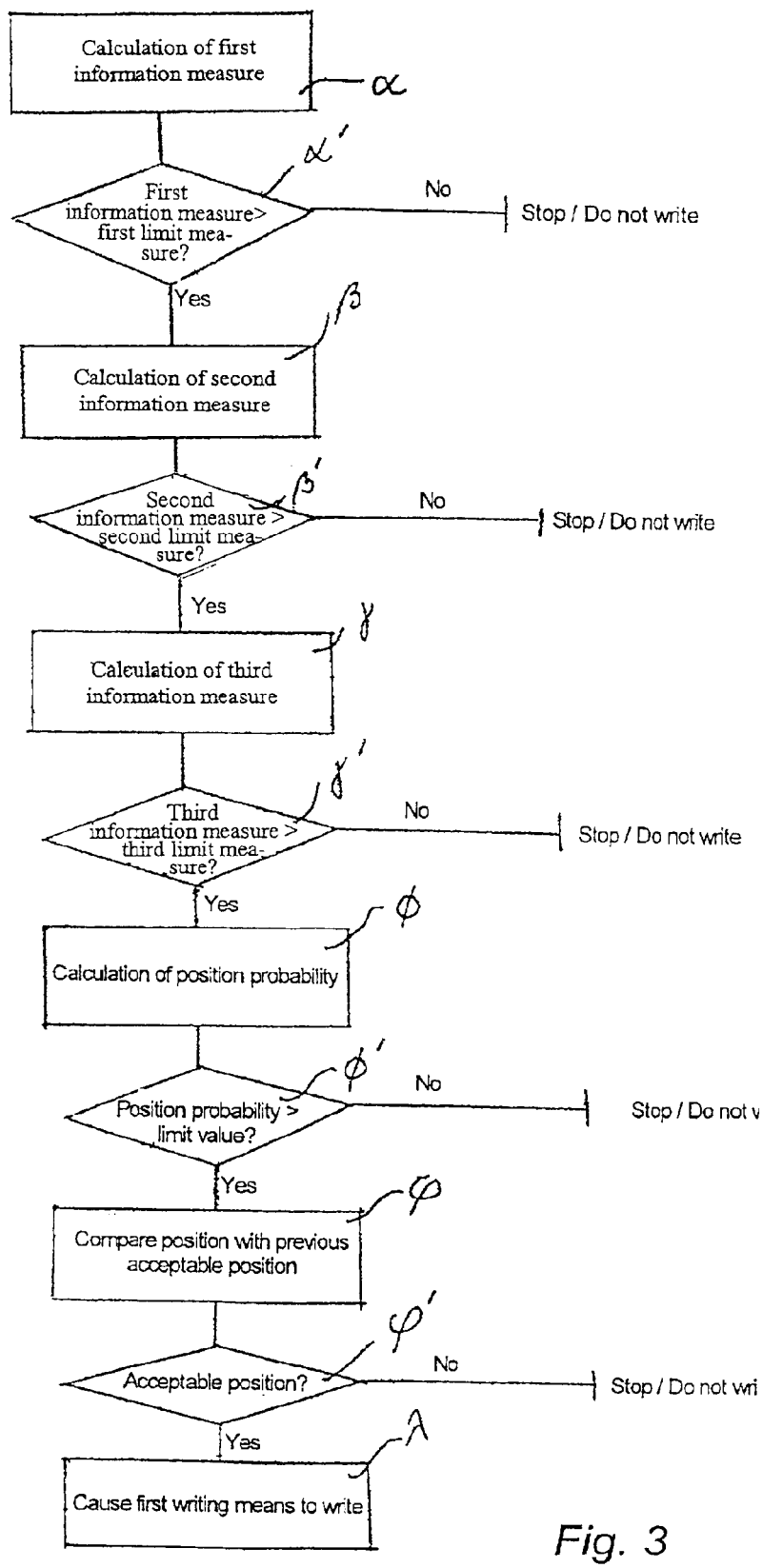
FIG. 3 shows a flow chart that illustrates the function of the device in FIG. 1.
Figure 4:
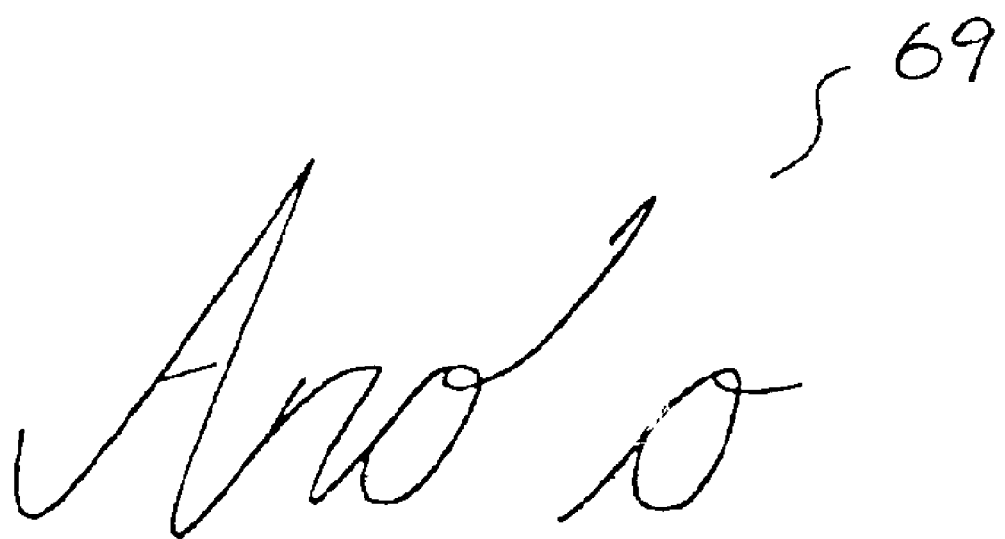
FIG. 4 shows an example of a result from a use of a device according to FIG. 1 on a surface.

FIG. 4 shows an example of a result from a use of a reading pen J. on a surface. In the example, the text "Anoto" 69 was to be written with the reading pen 1 and stored in the pen. As described above, images of the surface are recorded continually while the user is writing on the surface. Depending upon the result of all the steps in the flow chart in FIG. 3, the pen writes/does not write on the surface. In the text in FIG. 4 the letter "t" in "Anoto" is missing. This is because the image-processing means in the reading pen has decided that it is not possible to determine acceptable positions corresponding to the points on the surface that should have made up said letter "t". The image-processing means has therefore caused the writing means not to write on the surface at these points. The reason for acceptable positions corresponding to said letter "t" not being able to be determined can, for example, be that the position-coding pattern has become unreadable for some reason in the place where said letter "t" should have been. The reason for this can, for example, be that there is dirt on the surface or that the reading pen has been held in an unfavorable position in relation to the surface while recording in this area.

It is, of course, possible to combine the steps in the flow chart in FIG. 3 in different ways. They do not necessarily need to be carried out in the order described above. Nor do all the steps need to be carried out. It is quite possible to omit one or more of these steps. Nor is it necessary for the combination of steps to be the same during one and the same position-determination session with the reading pen. According to one example, a few initial recorded images are processed during one session according to step α- step ϕ'. The processing means then decides that it. is possible to determine the acceptable positions if the position probabilities for the corresponding images exceed the limit value. The subsequently recorded images are then processed according to step ϕ in those cases when positions can be determined on the basis of the images. The processing means then decides that it is possible to determine the acceptable positions if the determined positions lie within the predetermined distance from previously determined acceptable positions.

In the case when the position probability is obtained once a position has been calculated, the steps ϕ' and Φ can be combined so that a position is considered to be acceptable depending upon the combination of its position probability and its distance from one or more previously determined acceptable positions. For example, a low position probability can be compensated for by a small distance, and vice versa.

In the examples above, it has been assumed that the image-processing means is arranged to write on the surface only it an acceptable position can be determined. It is, of course, possible instead for the image-processing means to cause the writing means to write on the surface only when an acceptable position on the surface cannot be determined. It is also possible to have more than one writing means, for example with one dispensing ink the whole time and the other dispensing ink of a different color when an acceptable position cannot be determined.

In Appendix I with associated Figures, there is a comprehensive description of various position-coding patterns that can be used in association with the present invention. Appendix I also describes in detail how value probabilities can be calculated for the identified elements in a recorded image, and how a position can be calculated on the basis of the image. In addition, Appendix I describes many other different probability calculations that can be carried out in association with position determination according to the present invention.

In the examples described above, the value probabilities have been used for calculating information measures and position probabilities. The information measures and the position probabilities can, however, also be calculated on the basis of one or more of the other probabilities that are discussed in Appendix I. This means that the position probability for a position can be determined at different times during the position determination, and in different ways. This also means that the position determination can be terminated at any time if any probability used in the probability calculation is considered to be too small.

Figure 5:
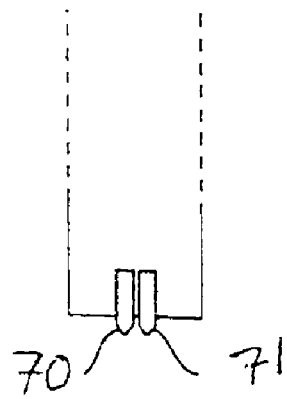
FIG. 5 shows part of a device according to an alternative embodiment of the present invention.

FIG. 5 shows a part of a device according to an alternative embodiment of the present invention, which device is provided with a first writing means 70 and a second writing means 71. The first writing means 70 is arranged to write on the surface only when an acceptable position can be determined. The second writing means 71 is arranged to write on the surface irrespective of whether or not an acceptable position can be determined.

Figure 6:
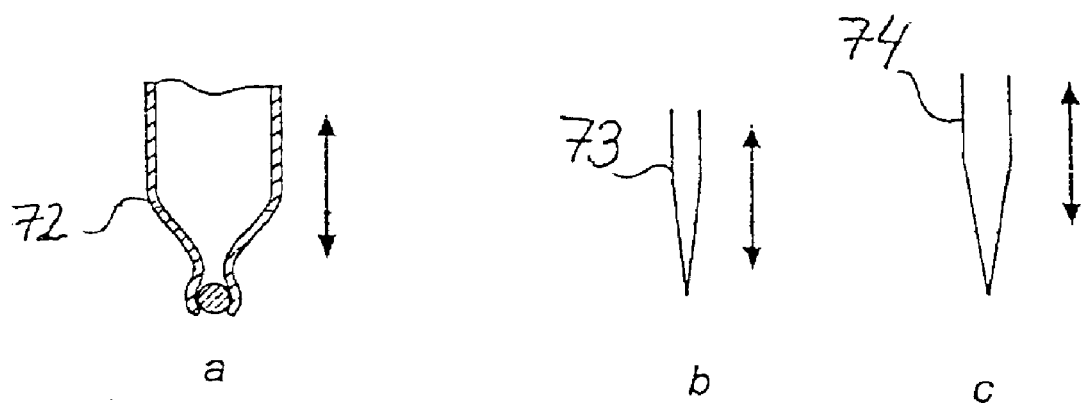
FIG. 6 shows alternative techniques for writing on a surface.

Writing of information on a surface using a device according to the present invention can be carried out in several ways. For example, instead of being a nozzle, the writing means could, as shown in FIG. 6a, be a ball point 72 for rolling ink onto the surface. When the supply of ink to the surface is cut off, this is suitably carried out by locking the ball so that it can no longer roll on the surface. Another alternative is shown in FIG. 6b in which an electromagnet 73 is used as writing means for writing on special paper containing small permanent magnets with a black and a white side. This paper works in such a way that when a magnet is passed across the surface the permanent magnets turn their black side upwards. Instead of turning the supply of ink from a nozzle on/off, the supply of electricity to the electromagnet 73 could thus be turned on/and of f in order in this way to control the writing of information depending upon whether or not a position has been determined. Yet another alternative, which is shown in FIG. 6c, could be to have a heating means 74 as writing means for heating up a surface that has the characteristic that it changes color when it is heated up.

The embodiments described above are only to be regarded as examples.

A person skilled in the art will recognize that the above embodiments can be varied in a number of ways without deviating from the concept of the invention.

There are alternatives to optical recording of the position code, for example those that are described in WO 00/73983 and WO 01/26033, which are herewith incorporated by reference.

APPENDIX I

This Appendix describes, with reference to the Figures, various position-coding patterns that may be used in connection with the present invention. It also describes in detail how probability calculations may be used in connection with determination, or decoding, of a position by means of a position-coding pattern on a surface.

Figure 7:
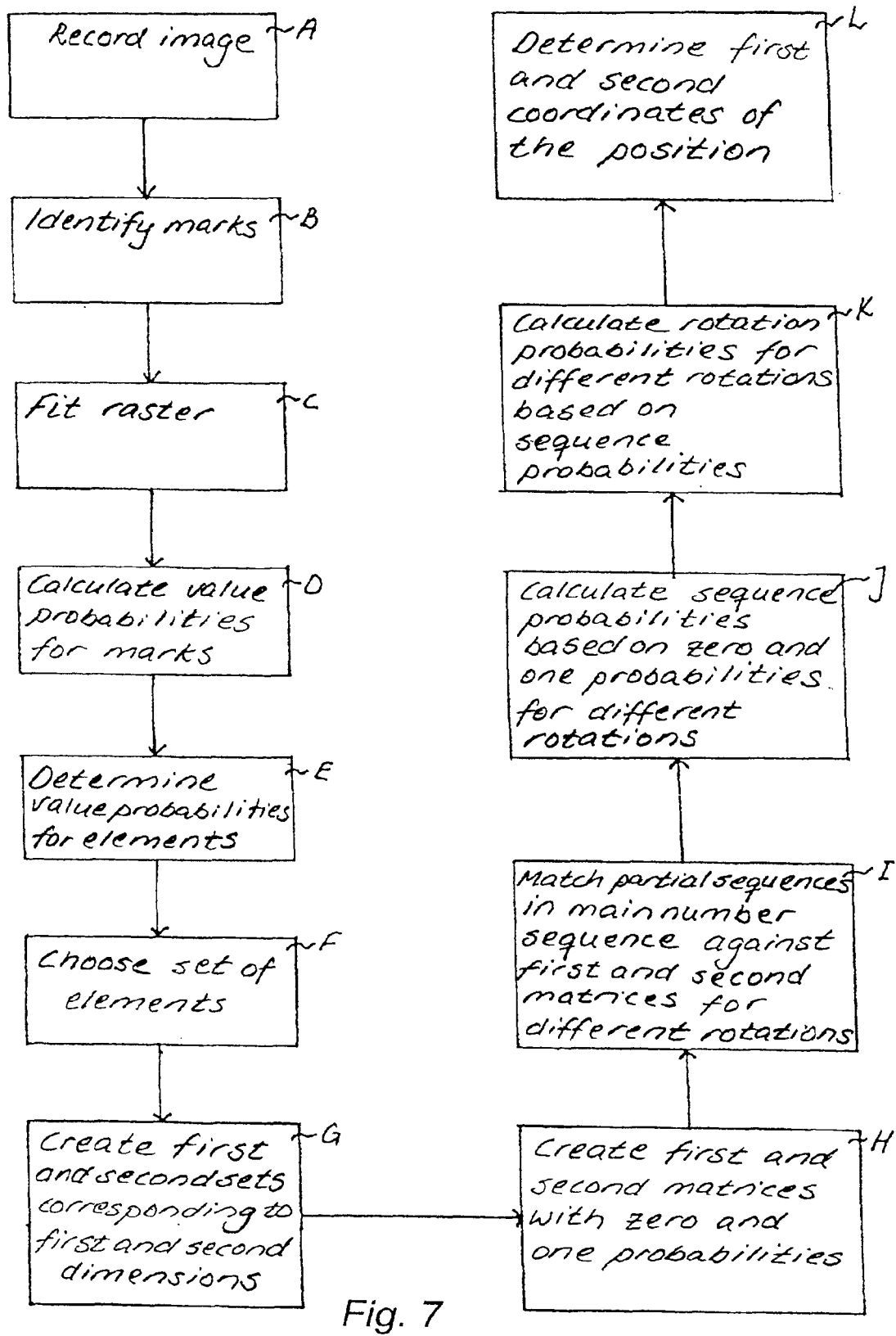
FIG. 7 shows a flow chart that describes a decoding example.

Now follows a description, with reference to the flow chart in FIG. 7, of an example of how a position-coding pattern can be decoded by means of probability calculations. The position-coding pattern to be decoded is of the type described in Applicant's Patent Publication WO 01/26032, which is herewith incorporated by reference.

Figure 8:
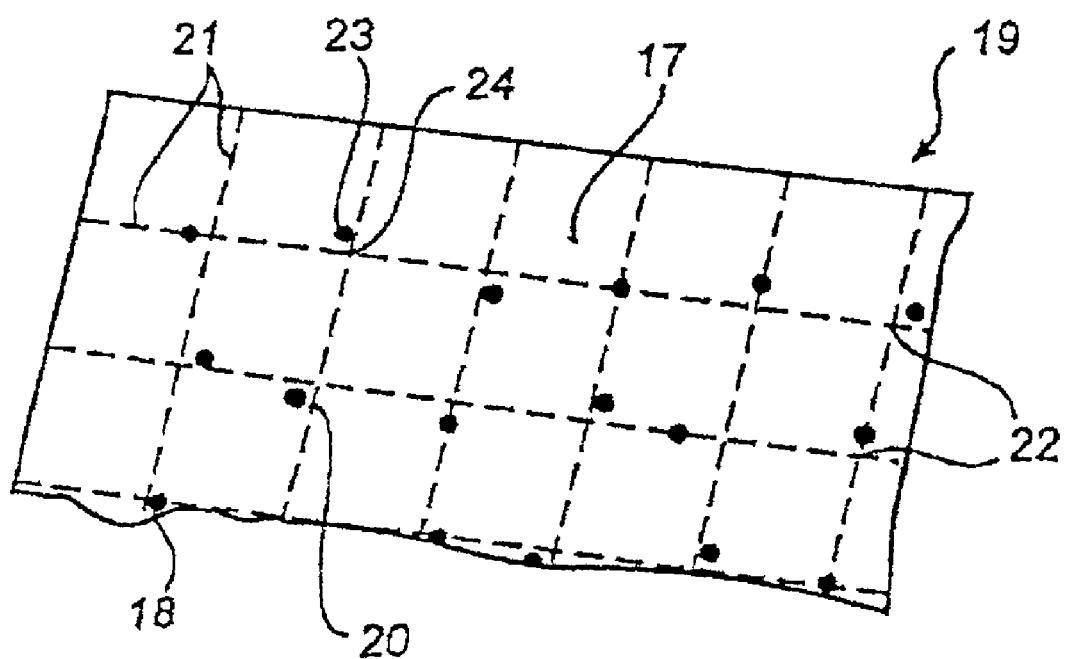
FIG. 8 shows an enlargement of a part of a first type of position-coding pattern on a surface.

FIG. 8 shows an enlarged part of an optically readable position-coding pattern 17 on a surface 19. The position-coding pattern consists of marks 18. A reading pen is arranged to record an image of a partial area of the position-coding pattern (step A) by means of a sensor, to identify a plurality of marks 18 in the image (step B), and to fit to the image a reference system in the form of a raster (step C) with raster lines 21 that intersect at raster points 22. The fitting is carried out in such a way that each of the marks 18 is associated with a raster point 22. For example, the mark 23 is associated with the raster point 24. Consequently the raster fitting makes it possible to determine to which raster point each mark belongs. In this example, the raster has the form of a square grid, but also other forms are possible. Applicant's Applications WO 01/75783, WO 01/26034 and SE 0104088-0, which are herewith incorporated by reference, disclose in more detail fitting of a raster to marks in an image. In the "ideal" position-coding pattern, one and only one mark is associated with each raster point. Owing to deformations and deficiencies in the imaging of the position-coding pattern, it may be difficult to determine in an image of the position-coding pattern which marks belong to the position-coding pattern and which of a plurality of marks is the one that is to be associated with a certain raster point. For this reason, it is possible to associate in this example a plurality of marks with one and the same raster point in the position determination. The marks associated with a raster point together form an element belonging to the raster point.

Figure 9:
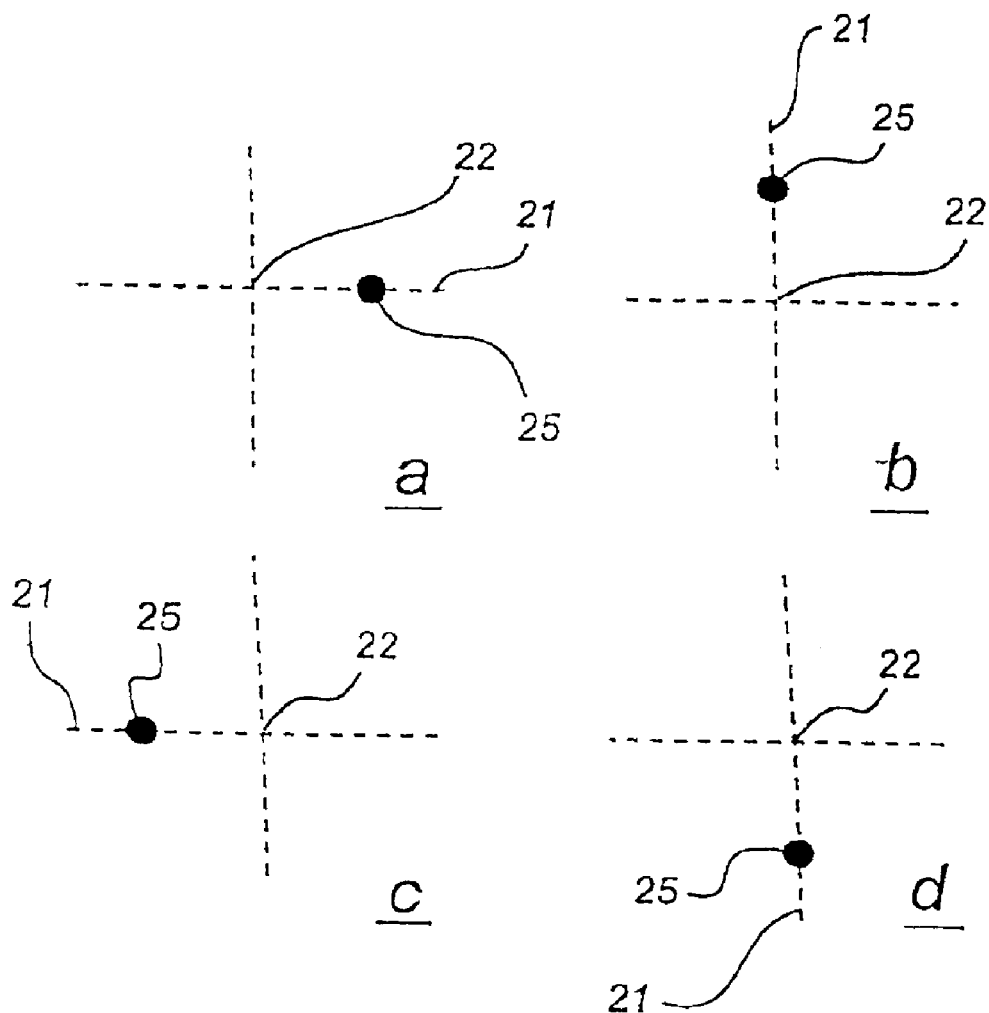
FIG. 9 shows four ideal locations of a mark in a position-coding pattern.

In the position-coding pattern in this example, the value of the marks 18 is defined by their displacement in relation to the raster points 22 with which they are associated. More specifically, it is the position of a point of a mark relative to a raster point that defines the value of the mark. This point is typically the main point of the mark. In the position-coding pattern in this example, there are four ideal locations for each mark. These locations are on each of the four raster lines 21 extending from the raster point 22 with which the mark is associated. The locations are situated at an equal distance from the raster point. The ideal locations 25 for a mark are shown enlarged in FIGS. 9a-d. They have the value "0" in FIG. 9a, the value "1" in FIG. 9b, the value "2" in FIG. 9c and the value "3" in FIG. 9d. Each mark can thus represent four different values "0-3".

Figure 10:
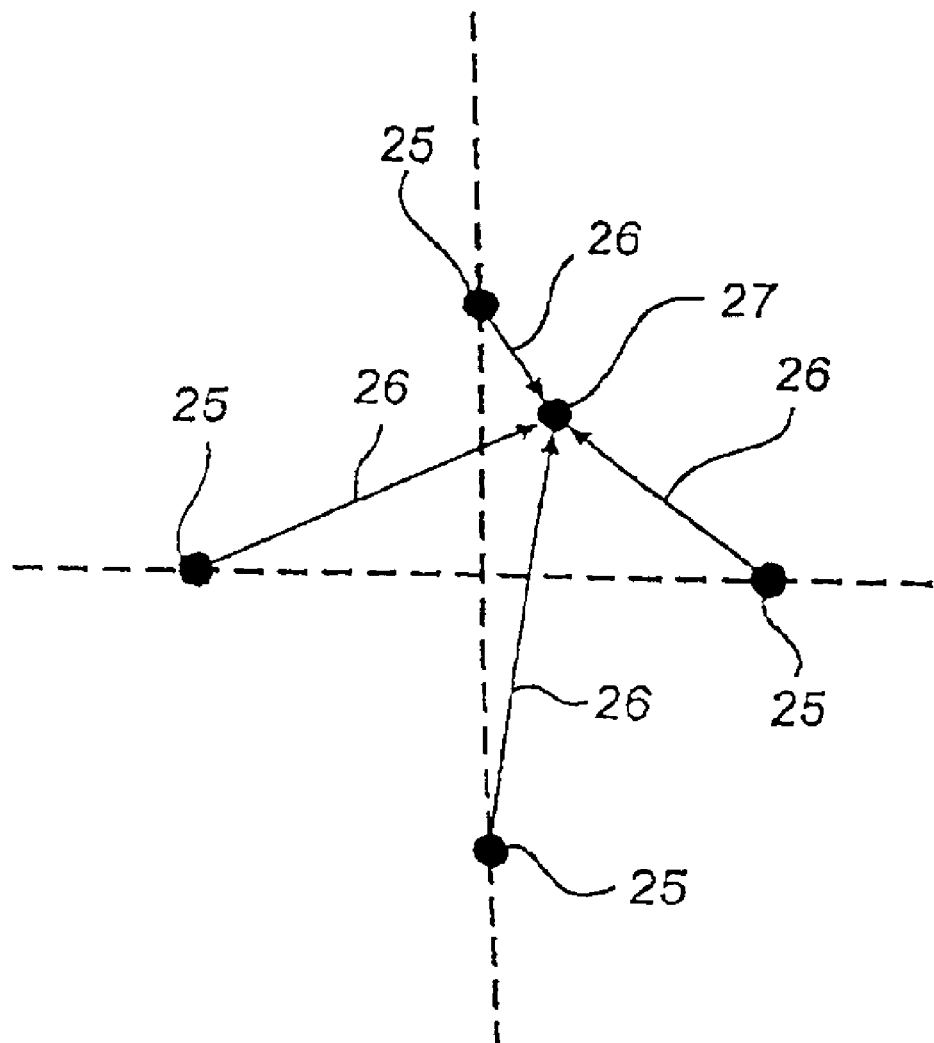
FIG. 10 shows how value probabilities tor a mark are calculated.

For various reasons, the marks identified in the recorded image often do not have an ideal location. In many cases it can therefore be difficult to unambiguously determine one value for a mark. Because of this, the reading pen is arranged to calculate, for each identified mark, an associated value probability for each value "0-3" that the mark defines this value (step D) . The value probabilities for each mark are a decreasing function of the distances 26 from the mark 27 to each of its ideal locations 25, see FIG. 10, or more specifically, typically from the main point of the mark 27 to each ideal location. The marks can be assumed to be normally distributed around the ideal locations. This means that the value probabilities, $P(d_i)$, can be calculated by the formula $P(d_i) = k \exp(-(d_i)^2/v)$, where k=a constant, the distance from a mark to an ideal location and v =a constant, in this example the variance of the distance. The variance can be determined empirically. Four value probabilities can thus be calculated for each mark.

It sometimes happens that a mark is found in the center of a raster point. In these cases, the four value probabilities for the mark will be equal, since the distances from the mark to each of the ideal locations are equally large. The case when there is no mark associated with a raster point, i.e. the associated element contains zero marks, is treated as if there was a mark in the center of the raster point, that is the value probabilities are equal.

If there is more than one mark, for example three, associated with a raster point, i.e. three marks in the associated element, there are a total of 3x4 value probabilities for the raster point or element. The reading pen is therefore arranged to determine, for each raster point or element and for each value, a value probability that the marks associated with the raster point together define this value (step E) . These value probabilities for a raster point could thus also be called raster point probabilities. By calculating the value probabilities for the raster points, all the marks in the recorded image may be taken into consideration in the position determination and the risk of information being lost is minimized. Since the above means that for each element, value probabilities are calculated that the element defines each of the values, the values "0"-"3" are called element values in the rest of the description.

The value probabilities for an element can be determined by the value probabilities for the marks in the element being compared, the highest value probability being selected for each possible element value. Alternatively, the value probabilities for the element can be weighted sums of the value probabilities for each of the possible element values for the marks in the element. The value probabilities for the elements can, of course, also be determined in other ways than those mentioned above.

Figures 11A, 11B, 11C:
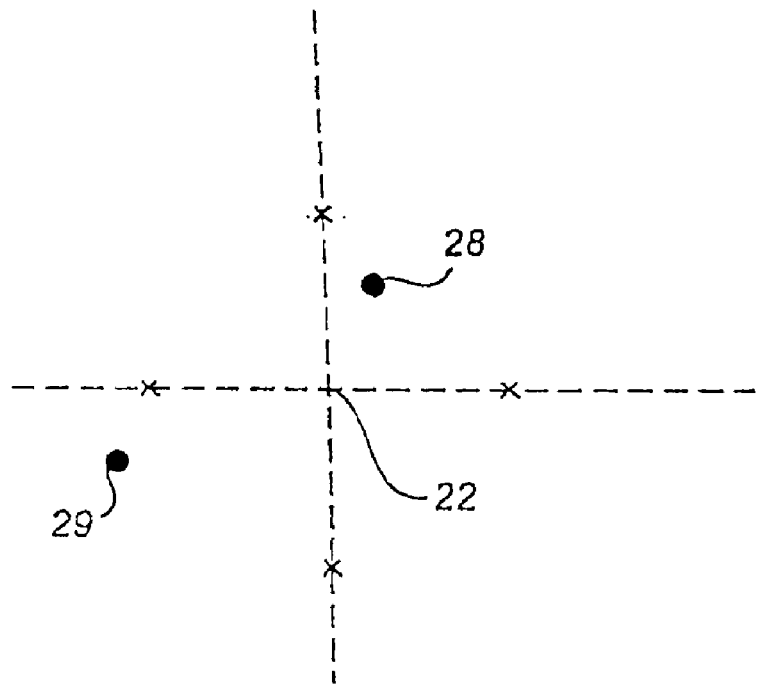
FIG. 11 shows how value probabilities for an element are calculated.

Calculation of the value probabilities for an element in this example is illustrated by means of the number example in FIG. 11. FIG. ila shows a raster point 22 with two associated marks 28 and 29. The marks 28 and 29 together constitute the element belonging to the raster point 22. The Tables 30 and 31 in FIG. 11b contain the value probabilities P1 for the possible values of the respective marks. The Table 32 in FIG. 11c contains the resulting value probabilities $P_2$ for the possible element values of the element. In this example, the value probabilities for the element are relative. Alternatively, they can instead by normalized in a suitable way. If there is only one mark associated with a raster point, i.e. one mark in the associated element, the value probabilities for the mark and the element are obviously the same.

When recording an image, the distance from the reading pen to the surface influences how large a part of the position-coding pattern is recorded and thereby also how large a raster can be fitted to the image. For converting the image into a position, a predetermined number of elements is used, which in this example is 8×8 elements. If more than 8×8 raster points have been fitted to the image, an excess of elements is thus identified. The reading pen is therefore further arranged to choose, from all the identified elements, the set of elements that provides the most information about the position on the surface (step F) . This set of element is, but need not be, continuous. The elements in the set of elements correspond in this example to a raster point matrix with raster points fitted to the image, but this is not a requirement. In other words, the purpose is to select the elements with associated value probabilities for each element value which maximize a total information value (previously referred to as position probability) for the recorded image. For this purpose, an entropy is calculated for each of the identified elements. Thereafter the 8×8 elements are chosen that give the smallest entropy sum, which corresponds to the maximum total information value for the recorded image. If the value probabilities for the elements are normalized so that $$\sum_i P_{2,i} = 1,$$

the entropy H for an element is calculated according to the following formula:

$$H = -\sum_i P_{2,i} \log_2(P_{2,i})$$

where $P_{2,i}$ is the value probability of the element for the element value i (i=0, 1, 2, 3) and where $\log_2$ is the two-logarithm. The entropy for an element is thus maximal when its value probabilities are equally high and minimal when all except one of the value probabilities are zero. An alternative to choosing 8×8 elements by means of entropy calculations is instead to use the highest value probability for each element as an information value. In this case, the continuous 8×8 elements are selected which maximize a total information value that consists of the sum of the information values for the 8×8 elements.

The position-coding pattern used in this example codes two coordinates for a point on the surface. These coordinates are separately decodable. Therefore they can be called data in two different dimensions. Each mark in the position-coding pattern codes more specifically a first bit which is used to decode the first coordinate and a second bit which is used to decode the second coordinate.

In the decoding of the position-coding pattern in the recorded image, each possible element value "0"-"3" for an element is therefore converted into a first and a second decoding value which in this example thus are binary. The reading pen is thus arranged to convert, for each of the 8×8 elements in the set of elements, the element values "0"–"3" into the four different bit combinations (0, 1) , (0, 0), (1, 0) and (1, 1) . The bit combinations have the value probabilities belonging to the element values, for each element, see the continuation of the previous number example in Table 33 in FIG. 12a. In the bit com.binations, the first bit, i.e. the first decoding value, refers to the first dimension and the second bit, i.e. the second decoding value1 to the second dimension. The value probability P2 for the corresponding element value is associated with the first and second decoding values. The set of elements can thus be used to create a first set of first decoding values with associated value probabilities for the first dimension, and a second set of second decoding values with associated value probabilities for the second dimension (step G) Table 33 describes an element in the set of elements. The Tables 33' and 33" contain the corresponding first decoding values in the first set with associated value probabilities and respectively the second decoding values in the second set with associated value probabilities. Each of the first and the second decoding values is, as is evident from that stated above, either a zero or a one. The reading pen is arranged to associate, for each element in the set of elements, each of the different possible first decoding values in the first set with one value probability, and each of the different possible second decoding values in the second set with one value probability. Since the possible first and second decoding values in this example are zero and one, the above results in one value probability for the decoding value zero and one for the decoding value one in the first and second sets for each element in the set of elements. In the following, the value probability for the decoding value zero is called zero probability and the value probability for the decoding value one is called one probability.

Referring to Table 33', in this example, the above is carried out for each of the elements in the set of elements by comparing the value probabilities in the first set that correspond to the first decoding value being zero. Then the highest value probability is chosen as zero probability and is saved in a first matrix 34. In the same way, the value probabilities in the first set that correspond to the first decoding value being one, are compared. Then the highest value probability is chosen as one probability and is also saved in the first matrix 34. Referring to Table 33", the above procedure is subsequently repeated for the value probabilities in the second set, the second decoding values and a second matrix 35. The first and second sets are thus used to create a first and a second matrix with zero and one probabilities (step H) . The result is illustrated in the continuation of the number example in FIG. 12b. Alternatively, a first and a second matrix with zero and one probabilities for the 8×8 elements in the set of elements are created by the value probabilities in the first set that correspond to the first decoding value being zero being added, the sum being stored as the zero probability, and by the value probabilities in the first set that correspond to the first number being one being added, the sum being stored as the one probability. The procedure is then repeated for the value probabilities in the second set and the second decoding values.

Thus the 8×8 elements in the set of elements now correspond to two matrices 34 and 35, each with 8×8 matrix elements, where each of the matrix elements contains one zero probability and one one probability. By means of these first and second matrices, coordinates can be determined for the position.

An alternative to choosing the set of elements after the determination of the value probabilities for all elements in the recorded image is to wait until matrices corresponding to the matrices 34 and 35 have been determined for all the identified elements. In this case, 8×8 matrix elements in each matrix can then be selected based on the corresponding zero and one probabilities. One way of doing this is to select 8×8 matrix elements in which one of the zero and one probabilities is high and the other low. In this case, the matrix elements corresponding to the same elements need not be selected for determination of both coordinates, the calculations proceeding with different corresponding elements for the two matrices.

In this example the position-coding pattern is in the first dimension based on a first cyclic main number sequence. This gives a condition for the relation between the element values of the elements. The first cyclic main number sequence has the property that the place therein for each partial sequence of a predetermined length is unambiguously determined. In this example the predetermined length is 6. If thus six succeeding numbers are taken in an arbitrary place in the first cyclic main number sequence, these six numbers occur only once in the first main number sequence in this succession. The property also applies if the end of the first main number sequence is connected to the beginning of the first main number sequence. Therefore, the first main number sequence is called cyclic. In this example a binary main number sequence is used. It the place for a partial sequence with six numbers is to be unambiguously determined, the first main number sequence can then maximally have the length $2^{6^6}=64$ and the partial sequences of the length 6 can have places 0–63 in the first main number sequence. If, however, a first main number sequence of the length 63 is chosen, it is possible, as will be evident from the following, to provide improved error correction properties. In the following, it will thus be assumed that the length of the first main number sequence is 63 and that it thus defines unique places in the range 0–62.

Figures 13, 14:
FIG. 13 shows a cyclic main number sequence.
FIG. 14 illustrates the calculation of a sequence probability.

FIG. 13 shows an example of a first cyclic main number sequence that can be used in connection with the position-coding pattern. The partial sequence 0,0,0,0,0,0 has, for instance, the unambiguous place 0, the partial sequence 1,1,1,1,1,0 the unambiguous place 9 and the partial sequence 1,1,1,0,1,0 the unambiguous place 11 in the first main number sequence. For determining a position on the surface, 6×6 elements must be identified in the recorded image. As discussed above, however, use is made of 8×8 elements for a position determination and the reason for this will be evident from the following. As stated above, the first cyclic main number sequence, on which the position-coding pattern is based in the first dimension, has the property that it contains merely mutually unique partial sequences of the length 6. consequently, also the place in the first cyclic main number sequence for each partial sequence of the length B is unambiguously determined. This fact it utilized in the determination of the coordinates for the position on the surface.

The reading pen is arranged to match each of the unique partial sequences of the length 8 in the first cyclic main number sequence with each of the columns in the first matrix 34 (step I) . The method is illustrated in FIG. 14. The Figure shows an example of a binary par- tial sequence 36 of the length 8 and a column 37 in the first matrix 34 (FIG. 7b), said column having matrix elements which each contain a zero probability and a one probability corresponding to the first decoding value being zero and one respectively. For each matrix element, one of the zero and one probabilities is selected depending on the corresponding number in the partial sequence 36. The first number in the partial sequence 36 is, for instance, zero, which means that the zero probability is selected for the first matrix element in the column 37. The second number in the partial sequence is one, which means that the one probability is selected for the second matrix element in the column 37. For each partial sequence in the first main number sequence, for each column in the first matrix 34, the reading pen is in addition arranged to calculate a first sequence probability (step J) by multiplication of the corresponding selected zero and the one probabilities for the matrix elements. In FIG. 14, the first sequence probability 38 corresponding to the partial sequence 36 and the column 37 has been calculated. After this operation, there will thus be 63 first sequence probabilities with a respective associated unique sequence value for each column in the first matrix 34. These sequence values are defined by the places of the corresponding partial sequences in the first cyclic main number sequence. The reading pen is arranged to select for each column the highest first sequence probability and the corresponding sequence value and save these.

The position-coding pattern in the second dimension is here based on a second cyclic main number sequence which in this example has the same properties as the first cyclic main number sequence.

The reading pen is further arranged to match, in a manner corresponding to that above, each of the unique partial sequences of the length 8 in the second cyclic main number sequence with each of the rows in the second matrix 35 (step I) . The rows in the matrix 35 have, just like the columns in the matrix 34, matrix elements which each contain one zero probability and one probability corresponding to the second decoding value being zero and one respectively. For each matrix element, one of the zero and one probabilities is selected depending on the corresponding number in a partial sequence in the second cyclic main number sequence. For each partial sequence in the second main number sequence, for each row in the second matrix 35, the reading pen is further arranged to calculate a second sequence probability (step J) by multiplication of the corresponding selected zero and one probabilities for the matrix elements. After this operation, there will thus be 63 second sequence probabilities with a respective associated unique sequence value for each column in the second matrix 35. These sequence values are defined by the places of the corresponding partial sequences in the second cyclic main number sequence. The reading pen is further arranged to select for each row the highest second sequence probability and the corresponding sequence value and save these. The position-coding pattern used in this example is based on use of different rotations or circular shifts of the cyclic main number sequences. In order to code positions in, for instance, the x direction, the first main number sequence is printed or arranged in some other manner rotated or circularly shifted in different ways in columns across the surface, i.e. in the y direction orthogonally to the direction in which positions are to be coded, from above and down. The main number sequence may be printed repeatedly in the same column, which is necessary if more positions than what corresponds to the length of the main number sequence are to be coded in the y direction.

The same rotation of the main number sequence is then used in all repetitions. Different rotations may however be used in different columns.

Each pair of adjoining columns defines a difference number D. The difference number D is given by the difference between the places in the main number sequence for the first partial sequence in each column. If instead the difference between the places for the partial sequences is taken one step down in the columns, the result will be the same as the places will be offset in the same way. The difference number D will thus always be the same independently of at what "height" in the columns the places of the partial sequences in the main number sequence are compared. For each pair of columns, the difference number D is thus constant in the y direction. The difference numbers between adjoining columns form a set of difference numbers than can be used to obtain a coordinate for a position on the surface in the first dimension.

The position-coding pattern in a second direction, for instance in the y direction in this case, can be based on the same principle as the position-coding pattern in the first dimension. The second main number sequence is then arranged with different circular shifts in rows on the surface, i.e. in the x direction, from the left to the right. Difference numbers are defined between adjoining rows and these difference numbers form a set of difference numbers that can be used to obtain a coordinate for a position on the surface in the second dimension.

Thus the position coding pattern consists of one partial position-coding pattern for the first direction and one partial position-coding pattern for the second direction.

As is evident from that stated above, the partial sequences are not written with their explicit values, but with a graphical coding. In the graphical coding, marks define a superposing of the partial position-coding patterns.

Since the position-coding pattern is based on main number sequences which are arranged in predetermined directions on the surface, the marks must be decoded in these directions for the position determination to be correct. The correct decoding directions are, as mentioned above, from above and down and from the left to the right.

Figure 15:
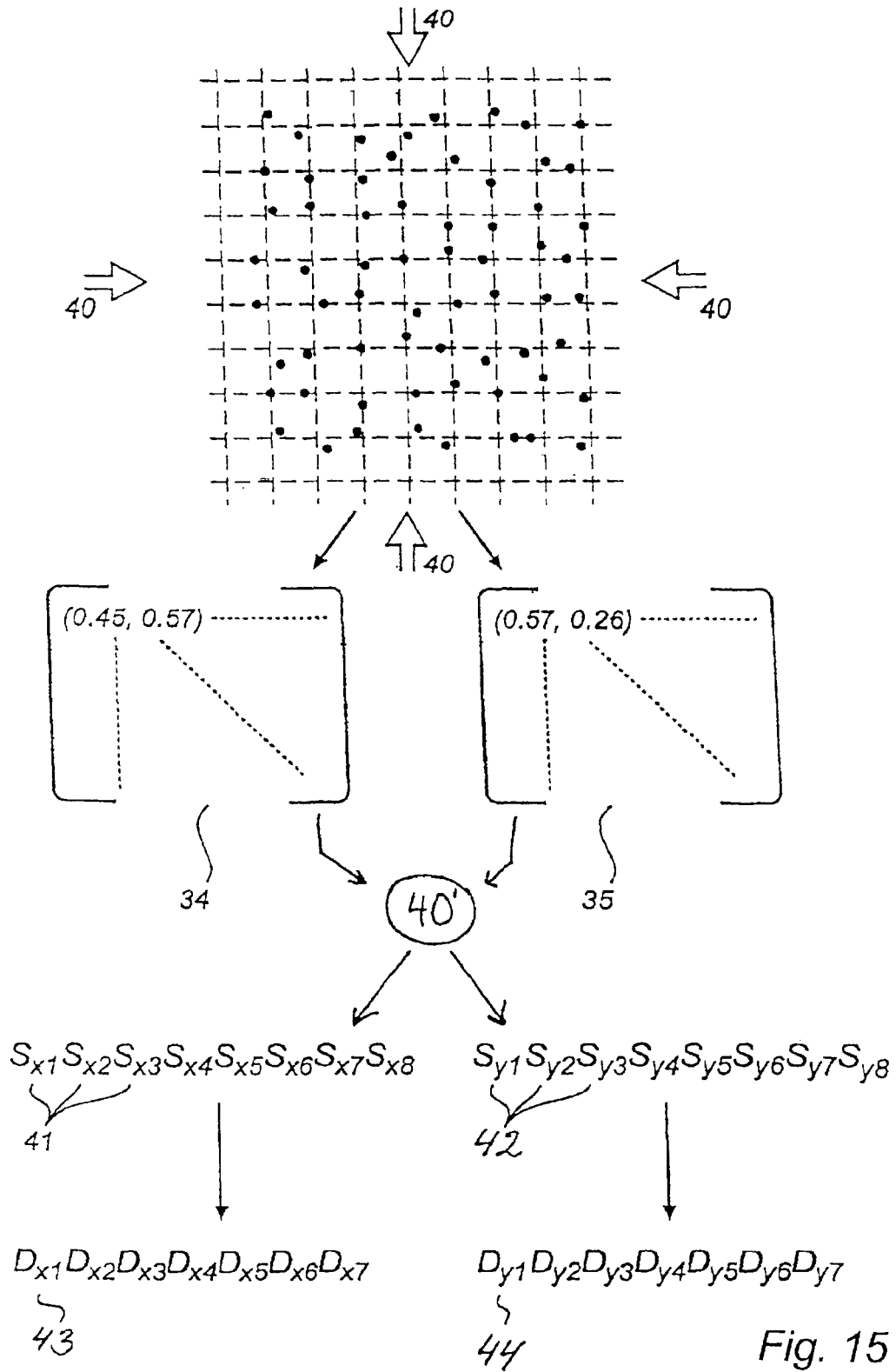
FIG. 15 illustrates steps in the position determination.

The reading pen can, when recording an image, be held rotated in different locations relative to the surface and the position-coding pattern. There are four possible recording rotations which are shown as arrows 40 in FIG. 15. The recorded image of the position-coding pattern does not in itself reveal the relative rotation between the position coding pattern and the reading pen since the position-coding pattern has essentially the same appearance if it is rotated through 0, 90, 180 or 270 degrees. When the position-coding pattern has been rotated, the direction of the displacement of each mark in relation to the raster point with which it is associated will, however, be changed. This results in turn in the bit combination (first decoding value, second decoding value) which is coded by the displacement of the mark being changed. With the "correct" rotation of the position-coding pattern, the marks are arranged in the correct decoding directions from above and down in the columns as well as from the left to the right in the rows. If the correct rotation of the position-coding pattern is zero, the following applies to the incorrect rotations:

- 90 degrees clockwise: the columns with marks in the "correct" rotation, which marks are arranged from above and down, will be rows with marks arranged from the right to the left, i.e. in the incorrect decoding direction, and the rows with marks in the "correct" rotation, which marks are arranged from the left to the right, will be columns with marks arranged from above and down, i.e. in the correct decoding direction.
- 180 degrees: the columns with marks in the "correct" rotation will be columns with marks arranged from below and up, i.e. in the incorrect decoding direction, and the rows with marks in the "correct" rotation will be rows with marks arranged from the right to the left, i.e. in the incorrect decoding direction.
- 270 degrees clockwise: the columns with marks in the "correct" rotation will be rows with marks arranged from the left to the right, i.e. in the correct decoding direction, and the rows with marks in the "correct" rotation will be columns with marks arranged from below and up, i.e. in the incorrect direction. If the marks in the columns and the rows are arranged in the incorrect decoding direction, the zero and one probabilities for each element will be inverted when decoded.

Therefore the reading pen is arranged to test, as will be described below, different rotations of the partial area of the position-coding pattern in the recorded image. The operation that was carried out on the first and the second matrix 34 and 35, respectively, i.e. the matching of the partial sequences in the cyclic main number sequences against columns and rows respectively in the matrices (step I), the calculation of sequence probabilities (step J), and the selection of the highest sequence probabilities with corresponding sequence values for the columns and the rows respectively, is carried out also on the first and the second matrix 34 and 35 rotated through 180 degrees and "inverted", which matrices in FIG. 12c are designated 34' and 35" respectively. These rotated, inverted matrices 34' and 35" correspond to an inverted version of the partial area of the position-coding pattern in the recorded image. The reason for this is explained in FIG. 16 which shows an example of a partial area of a position-coding pattern in a recorded image. In the Figure, only 9 marks are used for the sake of simplicity which are each associated with one raster point for the illustration. The position-coding pattern 45 is the one recorded in the image. The position-coding pattern 45' is the same position-coding pattern inverted. The matrices 46 and 47 correspond to the matrices 34 and 35 respectively for the position-coding pattern 45 turned the right way around, and the matrices 48 and 49 correspond to the matrices 34' and 35' respectively for the inverted position-coding pattern 45'. If the matrices 48 and 49 for the inverted position-coding pattern are rotated through 180 degrees and inverted, the matrices 46 and 47 will be obtained for the position-coding pattern turned the right way around. By inversion is in this context meant that the zero and one probabilities in each matrix element change places.

After the above procedure, there is a highest sequence probability with a corresponding sequence value for each column in the matrices 34 and 34', and for each row in the matrices 35 and 35'. For each of the matrices 34, 34', 35 and 35', the reading pen is then arranged to calculate a rotation probability (step K) by multiplication of the corresponding highest sequence probabilities. Based on the sequence values corresponding to the highest sequence probabilities for that of the matrices 34 and 34' which corresponds to the highest rotation probability, and the sequence values corresponding to the highest sequence probabilities for that of the matrices 35 and 35' which corresponds to the highest rotation probability, coordinates for the position can be calculated.

As described above, it is not necessary to examine all four rotations. This is simply explained by means of an example.

Figure 16:
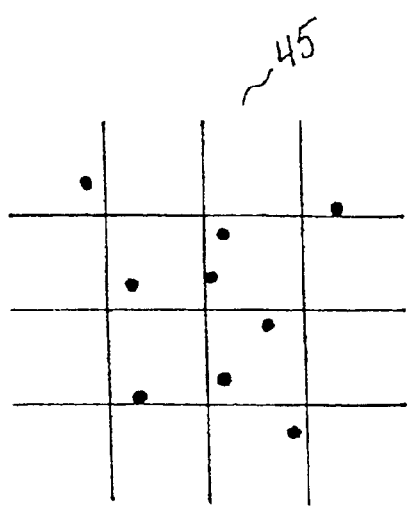
FIG. 16 illustrates rotation of a position-coding pattern.
Figure 16:
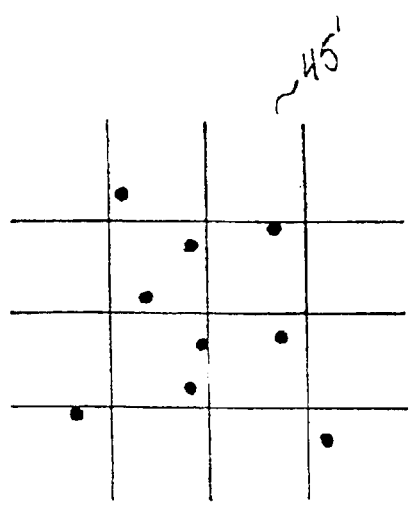

Now assume that the partial area of a position-coding pattern in an image that is recorded is the one (45) shown in FIG. 16. Further assume that the "correct" rotation of the position-coding pattern is rotated through 90 degrees clockwise relative to the recorded one. According to the above description, where the correct rotation is assumed to correspond to a rotation through 0 degrees, this means that the position-coding pattern 45 in the recorded image is rotated through 270 degrees clockwise relative to the "correct" rotation. Consequently, the position-coding pattern 45' is rotated through 90 degrees clockwise relative to the "correct" rotation. In the manner described above, the position-coding patterns 45, 45' in FIG. 16 are now decoded. The columns with marks in the "correct" rotation through 0 degrees are, as described above, rows arranged in the correct decoding direction in the position-coding pattern 45. The correct direction causes the sequence probabilities, and consequently the rotation probability, corresponding to these rows, to be high. The rows with marks in the correct rotation are, as described above, columns arranged in the incorrect decoding direction in the position-coding pattern 45. The incorrect direction causes the sequence probabilities, and consequently the rotation probability, corresponding to these columns, to be low. The relationship will be the opposite for the position-coding pattern 45'. The columns with marks in the correct rotation through 0 degrees are, as described above, rows arranged in the incorrect decoding direction in the position-coding pattern 45'. The incorrect direction combined with the inversion causes the sequence probabilities, and consequently the rotation probability, corresponding to these rows, to be low. The rows with marks in the correct rotation are, as described above, columns arranged in the correct decoding direction in the position-coding pattern 45'. The correct direction causes the sequence probabilities, and consequently the rotation probability, corresponding to these columns, to be high.

When recording the "correct" rotation of the position-coding pattern, the columns and the rows will, as mentioned above, extend in the "correct" direction in the image. This means for the example in FIG. 12 that the rotation probabilities for the matrices 34 and 35 will both be higher than the rotation probabilities for the matrices 34' and 35'. This is an indication that the "correct" rotation of the position-coding pattern has been recorded. Thus, a first coordinate can be calculated based on the sequence values corresponding to the highest sequence probabilities for the matrix 34, and a second coordinate can be calculated based on the sequence values corresponding to the highest sequence probabilities for the matrix 35.

When recording the position-coding pattern rotated through 180 degrees in relation to the "correct" rotation, the columns and the rows will extend in the "incorrect" direction in the image. This means for the example in FIG. 12 that the rotation probabilities for the matrices 34' and 35' will both be higher than the rotation probabilities for the matrices 34 and 35. This is an indication that the position-coding pattern has been recorded in the rotation through 180 degrees in relation to the "correct" rotation. Thus, a first coordinate can be calculated based on the sequence values corresponding to the highest sequence probabilities for the matrix 34', and a second coordinate can be calculated based on the sequence values corresponding to the highest sequence probabilities for the matrix 35'.

Recording of the position-coding pattern rotated through 90 or 270 degrees clockwise in relation to the "correct" rotation is indicated by the highest rotation probabilities not belonging to the same rotation. It it is assumed that the matrices 34 and 35 in FIG. 12 originate from a position-coding pattern which is rotated through 90 degrees clockwise in relation to the correct direction, the rotation probability for the matrix 34 will be higher than the rotation probability for the matrix 34', and the rotation probability for the matrix 35 will be lower than the rotation probability for the matrix 35'. In this case, the second coordinate is calculated based on the sequence values corresponding to the highest sequence probabilities for the matrix 34, and the first coordinate is calculated based on the sequence values corresponding to the highest sequence probabilities for the matrix 35'. If it is assumed instead that the matrices 34 and 35 in FIG. 11 originate from a position-coding pattern which is rotated through 270 degrees clockwise in relation to the correct direction, the second coordinate is instead calculated based on the sequence values corresponding to the highest sequence probabilities for the matrix 34', and the first coordinate is calculated based on the sequence values corresponding to the highest sequence probabilities for the matrix 35.

What allows the detection of the rotation of the position-coding pattern in the recorded image thus is the fact that the rotation probability for a matrix is changed when the matrix is rotated through 90, 180 or 270 degrees. It the rotation of the position-coding pattern is different from zero, i.e. if the rotation of the position-coding pattern in the recorded image is incorrect, the rotation probability as stated above will be low. This is because of the fact that the unique partial sequences of the length 8 in the cyclic main number sequences do not occur inverted and reversed in the main number sequences. If such a condition should be satisfied for the main number sequences for partial sequences of the length 6, it would mean that the main number sequences would be reduced significantly, which in turn would imply that fewer positions could be coded.

This is thus one reason why 8×8 elements are used for the position determination although only 6×6 are theoretically required.

The same basic principles as the ones used in the rotation detection can be used for error correction. For instance, the main number sequence can be selected so that partial sequences of a predetermined length, which is longer than the one required for position determination, do not occur with one bit inverted in the main number sequence. Then, if all bits except one in such a longer partial sequence can be detected with certainty, the incorrect bit can be corrected. This is another reason why 8×8 elements are used for the position determination although only 6×6 are theoretically required.

Thus, by an intelligent selection of the main number sequence, the error detection and error correction properties of the position-coding pattern can be considerably improved.

The property of the cyclic main number sequences that partial sequences of the length B do not occur inverted and reversed can, however, not be provided for a 64 bit long main number sequence, which is the reason why the length of the main number sequences has instead been selected to be 63.

In decoding, redundant information is thus used to obtain error correction properties. In the example described above, 8×8 elements are used in the decoding, although the position information can be extracted based on 6×6 raster points, i.e. there is 56 bit redundant information $[(8^2-6^2)x]$ for determining the position. In decoding, information in the current image is matched, by columns and by rows, with the different partial sequences that may occur in the position-coding pattern, while using the value probabilities belonging to the current image. The combination of redundant information, probabilities and a known condition for the relation between the values of the elements gives good insensitivity to interference in the current image. The value of each individual mark thus decreases in importance since the value of the individual mark must correspond to the other values in that of the partial sequences which gives the highest sequence probability.

If the need for error correction is more limited, the reading pen can alternatively be arranged to directly select, for each of the columns in the first matrix, and for each of the rows in the second matrix, a sequence, and thus a sequence value, corresponding to the highest of the zero and the one probability for each element.

When the rotation 40' of the recorded position-coding pattern in relation to the "correct" rotation has been established, the first and the second coordinate of the position can thus be determined (step L). This is carried out as described above, based on sequence values which in FIG. 15 are designated $Sx_1$-$Sx_8$ (41) for the first coordinate and $Sy_1$-$Sy_8$ (42) for the second coordinate.

The reading pen is arranged to calculate for the sequence values $Sx_1$-$Sx_8$ and $Sy_1$-$Sy_8$ differences between adjacent sequence values, which results in two sets, 43 and 44, of seven difference numbers $Dx_1$-$Dx_7$ and $Dy_1$-$Dy_7$ each. These difference numbers are then used to generate a first coordinate and a second coordinate.

For the calculation of the first coordinate, however, only six of the sequence values $Sx_1$-$Sx_8$, i.e. five of the difference numbers $Dx_{1-Dx7}$, are necessary as described above. According to this example, the sequence values $Sx_2$-$Sx_7$ and thus the difference numbers $Dx_2$-$Dx_6$ are used. The same applies to the second coordinate that is then calculated from the sequence values $Sy_2$-$Sy_7$ and thus the difference numbers $Dy_2$-$Dy_6$. Alternatively, only six sequence values are determined for each direction, $Sx_2$-$Sx_7$ and $Sy_2$-$Sy_7$ respectively.

The conversion from difference numbers to coordinates can be carried out in many ways, for example in the way that is described in Applicant's applications WO 01/26033 and SE 0103589-8, the latter being herewith incorporated by reference.

In the example described above, 8×8 elements have been identified, for the position determination, in a recorded image. However, it may sometimes happen that it is not possible to identify so many elements. "Empty" additional elements are then added to the elements that can be identified in the image to obtain a total of 8×8 elements. As described earlier, all the value probabilities for an "empty" element are equal.

Figure 17:
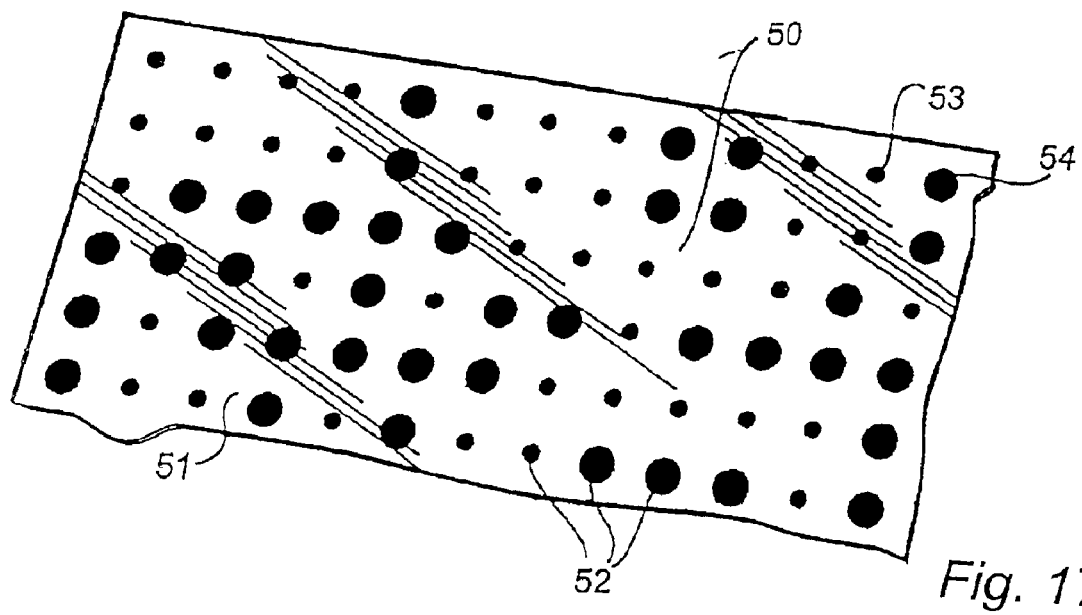
FIG. 17 shows a second type of position-coding pattern.

FIG. 17 shows a sheet of paper which has a surface 50 that is provided with an alternative position-coding pattern Si which consists of marks 52 and which for the sake of clarity is greatly enlarged. In this case, the value of the marks 52 is defined by their size. This type of position-coding pattern is described in Patent Publication WO 00/79383, which is herewith incorporated by reference.

In this case, the reading pen is arranged, just as described above, to record an image of a partial area of the position-coding pattern, to identify a plurality of marks in the image, and to fit a raster to the image so that each of the marks is associated with a raster point. Like in the case with the above position-coding pattern, the marks associated with a raster point constitute an element belonging to the raster point. Here are two possible values for each mark. The small mark 53 cor responds to the value zero and the large mark 54 corresponds to the value one, and there is an ideal size of the small and large marks.

The identified marks are usually not of an ideal size. In many cases, it can therefore be difficult to unambiguously determine a value for each mark 52. The reading pen is therefore arranged as above to calculate, for each identified mark, an associated value probability for each value "0" and "1" that the mark defines this value.

The size of the marks 52 may be assumed to be normally distributed around the ideal sizes, which means that the value probabilities P(r) can be calculated by the formula $P(r)=k \exp(-(R_i-r)^2/v)$, where k= a constant, $R_i$= ideal size, r= size of a mark and v= a constant, in this example the variance of the size. $R_i$ and r can be, for instance, areas or radii. The variance can be determined empirically.

Thus, for each mark, two value probabilities can be calculated. The case in which there is no mark associated with a raster point, i.e. the associated element contains zero marks, is dealt with as if there were two marks of the ideal size, one with the value "0" and one with the value "1", associated with the raster point.

If there is more than one mark, for example three, associated with a raster point, i.e. three marks in the associated element, then there are a total of 3×2 value probabilities for the raster point or element. The reading pen is therefore arranged as above to determine, for each raster point or element and for each value, value probabilities that the marks associated with the raster point together define this value. For each element, value probabilities are thus calculated that the element defines each of the values, and therefore the values "0" and "1" can also in this case be called element values.

The value probabilities for an element can be determined, as above, by the value probabilities for the marks in the element being compared, the highest value probability being selected for each element value. Alternatively, the value probabilities for the element can be weighted sums of the value probabilities for the element values for the marks in the element. In the case of this position-coding pattern, the value probabilities for the element can, of course, also be determined in other ways than those mentioned above.

Also in this case, the value probabilities for a mark and an element are the same if the element only contains that mark.

Like with the position-coding pattern described by way of introduction, the value probabilities for the elements are then used to determine a position on the surface in a manner corresponding to that described in detail above.

One alternative as regards the latter position-coding pattern is to let the value probabilities to be a function of the total dark area corresponding to a raster point. This alternative could be useful if there is only one mark associated with each raster point. Sometimes it may in fact happen that for some reason a mark in a recorded image of the position-coding pattern is not a completely continuous area. Then there is a risk that the mark appears to be split and thus, is perceived by the reading pen as several marks.

In the above described examples, probabilities have been multiplied on several different occasions to obtain various results. It can be pointed out that in cases in which the probabilities that are to be multiplied are described by exponential functions, logarithms can be used, so that the results are obtained instead by summing up exponents according to the following formula.

$$ln(exp(a) \cdot exp(b)) = ln(exp(a)) = \ln (exp(b)) = a+b$$

Figure 18A:
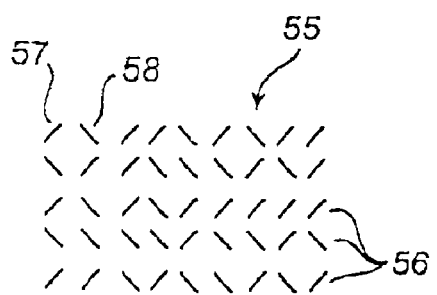
FIG. 18 shows an additional two examples of position-coding pattern.
Figure 18B:
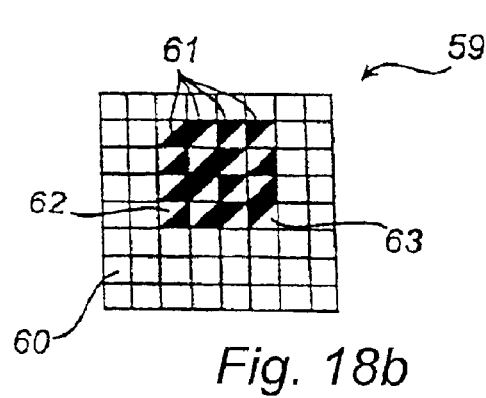

FIGS. 18a and b show two additional types of coding patterns that can be used in connection with the present invention. The coding pattern 55 in FIG. 18a consists of marks 56 in the form of small lines. The values of the marks 56 depend upon the inclination of the lines. The mark 57 corresponds to the value zero and the mark 58 corresponds to the value one. This type of coding pattern is described in the application US-A-5,245,165, which is herewith incorporated by reference. The coding pattern 59 in FIG. 18b consists of a square grid 60, with triangles 61 being placed in the squares. The square 62 has the value zero and the square 63 has the value one.

Another coding pattern that can be used in connection with the present invention consists of marks that have two different ideal shapes, a first and a second ideal shape, with the density of the marks on a surface providing information about the position. In this case, the density varies in two dimensions, the density of marks with a first ideal shape varying in a first dimension and the density of marks with a second ideal shape varying in a second dimension.

There are a plurality of other coding patterns that can be used in connection with the present invention, the variants described above only being regarded as examples.

When an image of a partial area of a position-coding pattern has been recorded, the marks are identified by dark continuous areas in the image being searched out. It is, however, the case that the dark continuous areas in the image are not necessarily marks in the position-coding pattern. There are sometimes impurities, for instance in the form of dust, on the surface on which the position-coding pattern is printed. These impurities cause noise marks in the recorded image, which noise marks may then by mistake be identified as marks in the position-coding pattern. Also sensor noise may cause noise marks in the recorded image. Noise marks in the recorded image may also originate from a defect on one of the components in the reading pen, for instance damaged pixels in the sensor.

In the first case, in which the values of the marks are determined based on their distance from the ideal locations, there is however a factor that prevents any noise marks from having an effect on the result of the position determination. If a good fit of a raster has been made for the recorded image, the noise marks will be located at a greater distance from the ideal locations than the marks of the position-coding pattern. In the second case, there is another factor that prevents the noise marks from having an effect on the result. The noise marks are usually much smaller than the marks of the position coding pattern. When determining the value probabilities for an element, the value probabilities for the noise marks will thus be of less importance since they are much lower than those for the marks of the position-coding pattern.

A person skilled in the art will recognize that the above examples can be varied in a number of ways without departing from the concept of the invention.

There are two different parameters for the marks in the position-coding patterns that have been discussed in this application, namely the location of the marks and their shape/size. Depending upon which position-coding pattern is used, one of the parameters will indicate the value of the marks. The other parameter can then suitably be used to calculate a probability of the identified mark being a mark in the position coding pattern.

In the case of the position-coding pattern in which the value of the marks is defined by their location in relation to a raster, for example, the area of the marks can correspond to a mark probability, which indicates the probability that a current mark is really a mark in the position-coding pattern. The value probabilities for each mark can then be multiplied by its mark probability before the raster point probabilities are calculated. An alternative to this method is that a form of area filter is used in the reading pen to remove the noise marks completely at an early stage. This filter acts in such a way that all marks that have an area that lies between two limit values are identified as marks in the position-coding pattern, while all marks outside the limit values are rejected.

In the case of the position-coding pattern in which the value of the marks is defined by their shape/size, for example, the location of the marks in relation to a raster can instead indicate the probability that a mark is a mark in the position-coding pattern.

It would of course also be possible to use the invention in connection with position determination in a single dimension. In the case of the position-coding pattern discussed by way of introduction, this would mean that one of said first and second sets would be used to determine in the manner described above a first or a second coordinate for the position.

The invention is not limited to use in connection with position-coding patterns that are based on binary number bases. Of course also other number bases can be used to express the cyclic main number sequences, as well as the element values in first and second decoding values.

Moreover, the invention is not limited to use in connection with position-coding patterns where the elements assume two or four element values. In one alternative, the elements may instead assume eight element values. Each element value may then be converted into a first, a second and a third decoding value for each of three dimensions. Consequently also a third set and a third matrix may be created for a third dimension. This could be used, for instance, to determine a position in three dimensions.

What we claim and desire to secure by Letter Patent is:

1. A device for position determination, comprising a processing means for determining a position on a surface, on the basis of an image of a position-coding pattern on the surface, wherein the processing means is arranged to decide whether it is possible to determine an acceptable position on the surface on the basis of the position-coding pattern in the image, and to cause a first writing means to write on the surface depending upon the result of said decision.

2. The device as claimed in claim 1, wherein the position-coding pattern contains elements each of which has at least two possible decoding values, the processing means being arranged to identify in the image a plurality of said elements, and, for each identified element, to calculate for each possible decoding value an associated value probability that the element has this decoding value.

3. The device as claimed in claim 2, wherein the processing means is arranged to identify elements, each of which comprises at least one mark, the value probabilities being calculated on the basis of the size of the marks in relation to a number of ideal sizes.

4. The device as claimed in claim 2, wherein the processing means is arranged to identify elements, each of which comprises at least one mark which is associated with one reference point from among a number of reference points in a reference system, and wherein the value probabilities are calculated on the basis of the location of the marks in relation to the reference points with which they are associated.

5. The device as claimed in claim 4, wherein the reference system is a raster and the reference points are raster points, each of which consists of an intersection in the raster.

6. The device as claimed in claim 1 wherein the processing means is arranged to cause the first writing means to write on the surface only if the processing means decides that it is possible to determine the acceptable position.

7. The device as claimed in claim 1, wherein the processing means is arranged to determine a measure for how much information the image contains concerning a position on the surface.

8. The device as claimed in claim 7, wherein the processing means is arranged to determine said measure on the basis of contrast distributions between light and dark areas in the image.

9. The device as claimed in claim 7, wherein the processing means is arranged to determine said measure on the basis of the number of separate objects that are identifiable in the image.

10. The device as claimed in claim 7, wherein the position-coding pattern contains elements each of which has at least two possible decoding values, the processing means being arranged to identity in the image a plurality of said elements, and, for each identified element, to calculate for each possible decoding value an associated value probability that the element has this decoding value, and
wherein the processing means is arranged to determine said measure on the basis of the value probabilities for the identified elements.

11. The device as claimed in claim 7, wherein the processing means is arranged to compare said measure with a predetermined limit measure, it being possible to determine a position on the surface if said measure exceeds said limit measure.

12. The device as claimed in claim 1, wherein the processing means is arranged to decide that it is possible to determine the acceptable position it it is possible to determine a position on the basis of the position-coding pattern in the image.

13. The device as claimed in claim 1, wherein the processing means is arranged, in the case when it is possible to determine a position on the basis of the position-coding pattern in the image, to determine a position probability corresponding to a level of certainty with which it is possible to determine said position.

14. The device as claimed in claim 13, wherein the position-coding pattern contains elements each of which has at least two possible decoding values, the processing means being arranged to identify in the image a plurality of said elements, and, for each identified element, to calculate for each possible decoding value an associated value probability that the element has this decoding value, and
wherein the processing means is arranged to calculate the position probability on the basis of the value probabilities for a predetermined number of the identified elements.

15. The device as claimed in claim 14, wherein the processing means is arranged to calculate the position probability on the basis of the largest value probability for each of said predetermined number of the identified elements.

16. The device as claimed in claim 13, wherein the processing means is arranged to decide that it is possible to determine the acceptable position if the position probability exceeds a predetermined limit value.

17. The device as claimed in claim 13, wherein the processing means is arranged to decide that it is possible to determine the acceptable position if the position probability exceeds a predetermined limit value, and said position has a permitted location in relation to a previously determined acceptable position.

18. The device as claimed in claim 13, wherein the processing means is arranged to decide that it is possible to determine the acceptable position if the position probability exceeds a predetermined limit value, and said position lies within a predetermined distance from a previously determined acceptable position.

19. The device as claimed in claim 1, wherein the processing means is arranged to decide that it is possible to determine the acceptable position if it is possible to determine a position on the basis of the position-coding pattern in the image, and said position has a permitted location in relation to a previously determined acceptable position.

20. The device as claimed in claim 1, wherein the processing means is arranged to decide that it is possible to determine the acceptable position if it is possible to determine a position on the basis of the position-coding pattern in the image, and said position lies within a predetermined distance from a previously determined acceptable position.

21. The device for position determination as claimed in claim 1, further comprising the first writing means.

22. The device as claimed in claim 21, wherein the first writing means is a nozzle that is arranged to dispense ink onto the surface.

23. The device as claimed in claim 21, further comprising a second writing means for writing on the surface irrespective of whether it is possible to determine the acceptable position on the surface on the basis of the image.

24. The device as claimed in claim 23 or 24, wherein the second writing means is a nozzle that is arranged to dispense ink onto the surface.

25. The device as claimed in claim 21, further comprising a second writing means for writing on the surface when the first writing means is not writing on the surface.

26. The device as claimed in claim 1, further comprising a sensor for recording said image of the position-coding pattern.

27. The device as claimed in claim 1, further comprising a transceiver for wireless transmission of data from the device to an external unit.

28. The device as claimed in claim 1, wherein the device is hand-held.

29. The device as claimed in claim 1, wherein the device is an application-specific integrated circuit.

30. A method for position determination, comprising processing an image of a position-coding pattern on a surface, wherein the processing comprises deciding whether it is possible to determine an acceptable position on the surface on the basis of the position-coding pattern in the image, and writing on the surface depending upon the result of said decision.

31. The method as claimed in claim 30, further comprising writing on the surface only if it is decided that it is possible to determine the acceptable position.

32. The method as claimed in claim 30, further comprising writing on the surface by dispensing ink.

33. The method as claimed in claim 30, further comprising recording said image of the position-coding pattern.

34. The method as claimed in claim 30, further comprising determining a measure of how much information the image contains concerning a position on the surface, comparing said measure with a predetermined limit measure, and determining a position on the surface if said measure exceeds said limit measure.

35. The method as claimed in claim 30, further comprising, in the case when it is possible to determine a position on the basis of the position-coding pattern in the image, determining a position probability corresponding to a level of certainty with which it is possible to determine said position, and deciding that it is possible to determine the acceptable position if the position probability exceeds a predetermined limit value.

36. The method as claimed in claim 30, further comprising deciding that it is possible to determine the acceptable position if it is possible to determine a position on the basis of the position-coding pattern in the image, and said position has a permitted location in relation to a previously determined acceptable position.

37. A computer readable medium containing instructions, executed by a processor, for performing a method for position determination comprising:

processing an image of a position-coding pattern on a surface, wherein the processing comprises deciding whether it is possible to determine an acceptable position on the surface on the basis of the position-coding pattern in the image, and writing on the surface depending upon the result of the decision.

38. The computer readable medium of claim 37, further comprising writing on a surface by dispensing ink.

39. The computer readable medium of claim 37, further comprising recording the image of the position-coding pattern.

40. The computer readable medium of claim 37, further comprising determining a measure of how much information the image contains concerning a position on the surface, comparing the measure with a predetermined limit measure, and determining a position on the surface if the measure exceeds the limit measure.

41. The computer readable medium as set forth in claim 37, further comprising in the case when it is possible to determine a position on the basis of the position-coding pattern in the image, determining a position probability corresponding to the level of certainty with which it is possible to determine the position, and deciding that it is possible to determine the acceptable position if the position probability exceeds a predetermined limit value.

42. The computer readable medium of claim 37, further comprising deciding that it is possible to determine the acceptable position if it is possible to determine a position on the basis of the position-coding pattern in the image, and the position has a permitted location in relation to a previously-determined acceptable position.

* * * * *